United States Patent
Li et al.

(10) Patent No.: US 10,264,478 B2
(45) Date of Patent: Apr. 16, 2019

(54) METHODS AND APPARATUS TO ENHANCE RELIABILITY IN MILLIMETER WAVE WIDEBAND COMMUNICATIONS

(71) Applicant: Samsung Electronics Co., Ltd., Suwon-si, Gyeonggi-do (KR)

(72) Inventors: Ying Li, Richardson, TX (US); Zhouyue Pi, Allen, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 13/712,393

(22) Filed: Dec. 12, 2012

(65) Prior Publication Data

US 2013/0155847 A1   Jun. 20, 2013

Related U.S. Application Data

(60) Provisional application No. 61/576,902, filed on Dec. 16, 2011.

(51) Int. Cl.
| | |
|---|---|
| *H04W 24/04* | (2009.01) |
| *H04L 1/20* | (2006.01) |
| *H04W 76/10* | (2018.01) |
| *H04W 88/02* | (2009.01) |
| *H04W 88/08* | (2009.01) |

(52) U.S. Cl.
CPC ........... *H04W 24/04* (2013.01); *H04L 1/20* (2013.01); *H04W 76/10* (2018.02); *H04W 88/02* (2013.01); *H04W 88/08* (2013.01)

(58) Field of Classification Search
CPC ..... H04W 24/04; H04W 80/04; H04W 64/00; H04W 48/20; H04W 48/16

USPC ......... 455/422.1, 427, 436, 440, 452.1, 561, 455/562.1, 419, 422, 434, 439; 375/148, (Continued)

(56) References Cited

U.S. PATENT DOCUMENTS

| | | | | |
|---|---|---|---|---|
| 6,122,499 A | * | 9/2000 | Magnusson | .................. 455/405 |
| 6,233,456 B1 | * | 5/2001 | Schiff | ................ H04B 7/18541 |
| | | | | 455/436 |

(Continued)

FOREIGN PATENT DOCUMENTS

| | | |
|---|---|---|
| CN | 101030788 | 9/2007 |
| KR | 10-2009-0113865 A | 11/2009 |

OTHER PUBLICATIONS

International Search Report dated Mar. 28, 2013 in connection with International Patent Application No. PCT/KR2012/010928, 3 pages.

(Continued)

*Primary Examiner* — Alpus Hsu
*Assistant Examiner* — Camquyen Thai

(57) ABSTRACT

A network node in a wireless network performs a method for enhancing reliability in wireless communication. The method includes determining, at a first network node, that a current link with a second network node is broken. The method also includes attempting, at the first network node, to recover the current link. The method further includes, upon a determination that the current link is not recoverable, establishing, at the first network node, a new link with the second network node according to one of a plurality of switching rules, the switching rules ordered according to a priority among the switching rules.

20 Claims, 14 Drawing Sheets

(58) Field of Classification Search
USPC ........ 375/260, 350; 370/236, 216, 332, 252, 370/331, 238, 328
See application file for complete search history.

(56) References Cited

U.S. PATENT DOCUMENTS

| | | | |
|---|---|---|---|
| 6,580,910 B1* | 6/2003 | Mazur et al. ................. 455/440 |
| 2002/0126744 A1* | 9/2002 | Bender et al. ................ 375/148 |
| 2002/0196840 A1* | 12/2002 | Anderson et al. ............ 375/130 |
| 2004/0018834 A1* | 1/2004 | Talaie et al. ............... 455/422.1 |
| 2005/0277443 A1* | 12/2005 | Ozluturk .................... 455/562.1 |
| 2005/0288031 A1* | 12/2005 | Davis .................... H04W 40/06 455/452.1 |
| 2007/0177510 A1* | 8/2007 | Natarajan ............. H04W 36/22 370/238 |
| 2008/0182580 A1* | 7/2008 | Laroia et al. ................ 455/440 |
| 2008/0220784 A1 | 9/2008 | Somasundaram et al. |
| 2008/0305801 A1 | 12/2008 | Burgess et al. |
| 2009/0232240 A1* | 9/2009 | Lakkis .......................... 375/260 |
| 2010/0026575 A1 | 2/2010 | Maruhashi et al. |
| 2010/0056171 A1* | 3/2010 | Ramprashad et al. ..... 455/452.1 |
| 2010/0120434 A1* | 5/2010 | Hasegawa .................... 455/436 |
| 2010/0238869 A1* | 9/2010 | Bruin .................. H04B 7/0604 370/329 |
| 2010/0265825 A1* | 10/2010 | Blair et al. .................... 370/236 |
| 2010/0311404 A1* | 12/2010 | Shi ....................... H04W 8/205 455/419 |
| 2010/0311469 A1* | 12/2010 | Smith et al. ............... 455/562.1 |
| 2010/0322185 A1 | 12/2010 | Park et al. |
| 2011/0170516 A1* | 7/2011 | Hu .................... H04W 36/0033 370/331 |
| 2011/0170518 A1 | 7/2011 | Randriamasy et al. |
| 2011/0171983 A1 | 7/2011 | Tiwari |
| 2011/0205910 A1* | 8/2011 | Soomro ................ H04W 80/04 370/252 |
| 2013/0100928 A1* | 4/2013 | Matsumori et al. .......... 370/331 |

OTHER PUBLICATIONS

Written Opinion of International Searching Authority dated Mar. 28, 2013 in connection with International Patent Application No. PCT/KR2012/010928, 5 pages.

First Office Action dated Aug. 3, 2016 in connection with Chinese Application No. 201280069874.1, 18 pages.

Korean Intellectual Property Office Notice of Preliminary Rejection regarding Application No. 10-214-7015565, dated Aug. 22, 2018, 10 pages.

* cited by examiner

METHODS AND APPARATUS TO ENHANCE RELIABILITY IN MILLIMETER WAVE WIDEBAND COMMUNICATIONS

CROSS-REFERENCE TO RELATED APPLICATION(S) AND CLAIM OF PRIORITY

The present application claims priority to U.S. Provisional Patent Application Ser. No. 61/576,902 filed Dec. 16, 2011, entitled "METHODS AND APPARATUS TO ENHANCE RELIABILITY IN MILLIMETER WAVE WIDEBAND COMMUNICATIONS. The content of the above-identified patent documents is incorporated herein by reference.

TECHNICAL FIELD

The present application relates generally to wireless communication and, more specifically, to a method and apparatus to enhance reliability in millimeter wave wideband communications.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

For use by a network node in a wireless network, a method for enhancing reliability in wireless communication is provided. The method includes determining, at a first network node, that a current link with a second network node is broken. The method also includes attempting, at the first network node, to recover the current link. The method further includes, upon a determination that the current link is not recoverable, establishing, at the first network node, a new link with the second network node according to one of a plurality of switching rules, the switching rules ordered according to a priority among the switching rules.

A base station configured to enhance reliability in a wireless network is provided. The base station includes a processor configured to determine that a current link with a network node is broken. The processor is also configured to attempt to recover the current link. The processor is further configured to, upon a determination that the current link is not recoverable, establish a new link with the network node according to one of a plurality of switching rules, the switching rules ordered according to a priority among the switching rules.

A mobile station configured to enhance reliability in a wireless network is provided. The mobile station includes a processor configured to determine that a current link with a base station is broken. The processor is also configured to attempt to recover the current link. The processor is further configured to, upon a determination that the current link is not recoverable, establish a new link with the base station according to one of a plurality of switching rules, the switching rules ordered according to a priority among the switching rules.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
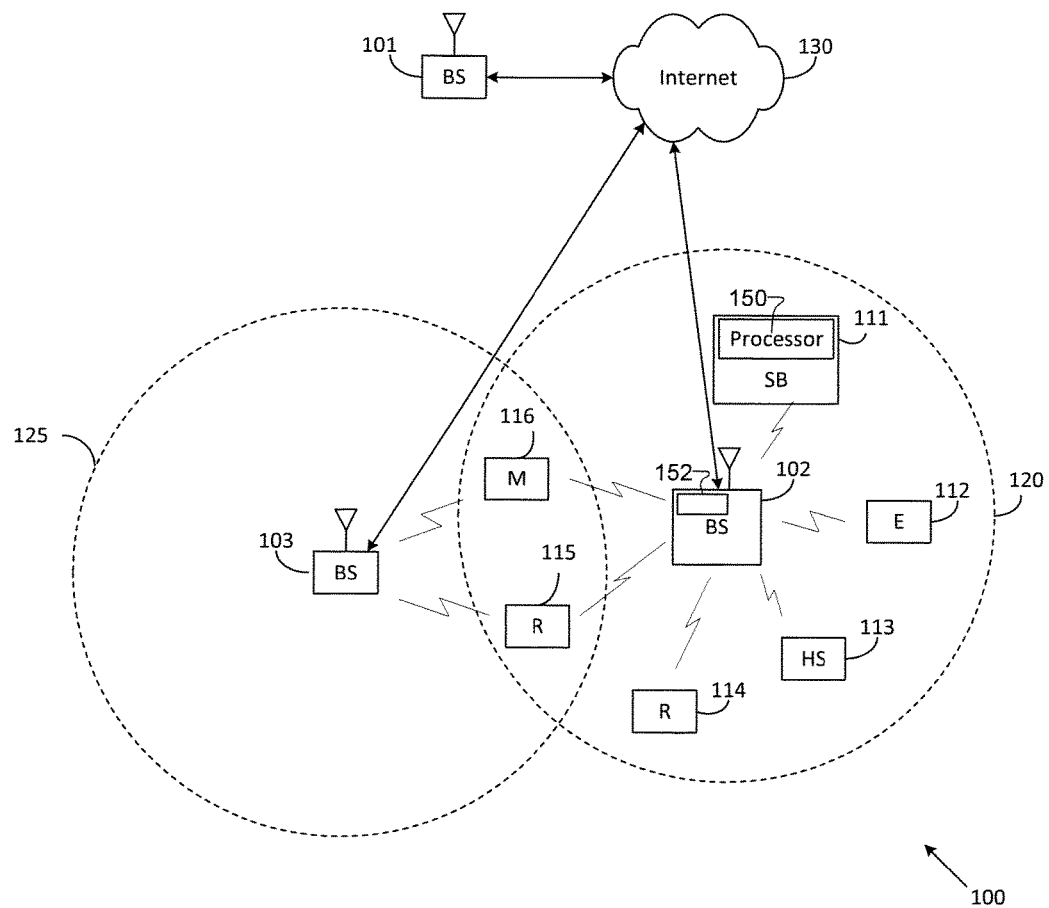
FIG. 1 illustrates a wireless communication network, according to embodiments of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Aspects, features, and advantages of the disclosure are readily apparent from the following detailed description, through illustration of a number of embodiments and implementations. The disclosure also encompasses other and different embodiments, and its several details can be modified in various obvious respects, all without departing from the spirit and scope of the disclosure.

In this disclosure, a limited number and types of base stations and mobile stations, service flows, connections, routes, or use cases may be used as examples for illustration. However, the embodiments disclosed herein are also applicable to other numbers and types of base stations, mobile stations, service flows, connections, routes, and other related use cases.

The following documents and standards descriptions are hereby incorporated into the present disclosure as if fully set forth herein: (i) F. Khan and Z. Pi, "MmWave Mobile Broadband (MMB): Unleashing The 3-300 GHz Spectrum", in Proc. Sarnoff Symposium, 2011 (hereinafter "REF1"); Z. Pi and F. Khan, "An Introduction To Millimeter-Wave Mobile Broadband Systems", IEEE Communication Magazine, June 2011 (hereinafter "REF2"); and Z. Pi and F. Khan, "System Design And Network Architecture For A Millimeter-Wave Mobile Broadband (MMB) System", in Proc. Sarnoff Symposium, 2011 (hereinafter "REF3").

The demand for wireless data traffic is rapidly increasing due to rising popularity among consumers and businesses of smart phones and other mobile data devices such as notepads, netbooks and eBook readers. In order to meet the high growth in mobile data traffic, improvements in radio interface efficiency and allocation of new spectrum is of paramount importance.

The current fourth generation wireless communication systems ("4G systems"), including LTE and Mobile WiMAX, use advanced technologies such as OFDM (Orthogonal Frequency Division Multiplexing), MIMO (Multiple Input Multiple Output), multi-user diversity, link adaptation, and the like, in order to achieve spectral efficiencies which are close to theoretical limits in terms of bps/Hz/cell. Continuous improvements in air-interface performance are being considered by introducing new techniques such as carrier aggregation, higher order MIMO, coordinated Multipoint (CoMP) transmission and relays, and the like. However, it is generally agreed that any further improvements in spectral efficiency will likely be marginal.

When spectral efficiency in terms of bps/Hz/cell cannot be improved significantly, another possibility to increase capacity is to deploy many smaller cells. However, the number of small cells that can be deployed in a geographic area can be limited due to costs involved for acquiring the new site, installing the equipment, provisioning backhaul, and so forth. In theory, to achieve a one-thousand-fold increase in capacity, the number of cells also needs to be increased by the same factor. Another drawback of very small cells is frequent handoffs which increase network signaling overhead and latency. Thus, while small cells may be a component of future wireless networks, the small cells alone are not expected to meet the capacity required to accommodate orders of magnitude increase in mobile data traffic demand in a cost effective manner.

In addition to the new technologies described above, more technologies are being explored to meet the explosive demand of mobile data. REF1, REF2, and REF3 discuss the use Millimeter-wave band (3-300 GHz spectrum) for Mobile Broadband (MMB) applications, with wide area coverage. Key advantages for these frequencies are spectrum availability and small component sizes such as antennas and other radio devices due to short wavelengths. Due to their smaller wave lengths, more millimeter wave antennas can be placed in a relative small area, thus enabling high-gain antenna in a small form factor. Larger bands can be used and higher throughput can be achieved using MMB communications compared to current 4G systems.

In current cellular systems, a mobile station (MS) can detect a base station (BS) using one or more omni-receiving antennas, and transmit information to the BS using one or more omni-transmitting antennas or antennas with a very wide beam. These features permit the MS to easily listen to the downlink control channel from the BS and detect the BS, and also permit the MS to easily send information to the BS during a random access procedure.

However, in certain newer cellular systems with directional antennas or antenna arrays, such as a MMB cellular system, one of the challenges is how a mobile station can detect base stations and establish communication to get into the network. One reason that makes it a challenge is that a base station can send its downlink control channel (e.g., a synchronization channel) or broadcast channel in directional beams, while the mobile station may receive and send information in directional beams. This makes it more difficult for a mobile station to discover base stations and try to randomly access the network. In some networks (see, e.g., REF1, REF2 and REF3), there is no specific technology to solve the problem of how to efficiently and reliably support a mobile station's random access to the network in a system with directional antennas or antenna arrays.

This disclosure describes methods and apparatus to enhance reliability in millimeter wave wideband communications. Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

As described above, millimeter waves typically refer to radio waves with wavelengths in the range of 1 mm-100 mm, which corresponds to a radio frequency of 3 GHz-300 GHz. As defined by ITU (International Telecommunications Union), these frequencies are also referred to as the EHF (Extremely High Frequency) band. These radio waves exhibit unique propagation characteristics. For example, compared with lower frequency radio waves, millimeter waves are often associated with higher propagation loss, have poorer ability to penetrate objects (e.g., buildings, walls, and foliage), and are more susceptible to atmosphere absorption, deflection and diffraction due to particles (e.g., rain drops) in the air. However, due to their smaller wavelengths, more millimeter wave antennas can be placed in a relatively small area, thus enabling high-gain antennas in a small form factor. In addition, due to the aforementioned perceived disadvantages, these radio waves have been less utilized than the lower frequency radio waves. Accordingly, spectrum in this band may be acquired at a lower cost.

The ITU defines frequencies in 3 GHz-30 GHz as SHF (Super High Frequency). The frequencies in the SHF band exhibit behavior similar to radio waves in the EHF band (i.e., millimeter waves), such as large propagation loss and the possibility of implementing high-gain antennas in small form factors.

Vast amounts of spectrum are available in the millimeter wave band. The millimeter wave band has been used, for example, in short range (within 10 meters) communications. However, the existing technologies in millimeter wave band are not optimized for commercial mobile communication having a wider coverage, so there is currently no significant commercial cellular system in millimeter wave band. Throughout this disclosure, mobile broadband communication systems deployed in 3-300 GHz frequencies will be referred to as millimeter-wave mobile broadband (MMB).

One system design approach is to leverage the existing technologies for mobile communication and utilize the millimeter wave channel as additional spectrum for data communication. In such a system, communication stations (including different types of mobile stations, base stations, and relay stations) communicate using both cellular bands and millimeter wave bands. The cellular bands may be in the frequency of approximately a few hundred megahertz to a few gigahertz. Compared with millimeter waves, the radio waves in these frequencies may exhibit less propagation loss, can better penetrate obstacles, and are less sensitive to non-line-of-sight (NLOS) communication links or other impairments such as absorption by oxygen, rain, and other particles in the air. Therefore, it may be advantageous to transmit certain important control channel signals via the cellular radio frequencies, while utilizing the millimeter waves for high data rate communication.

In another system design approach, both stand-alone mobile communications and control/data communications may occur in MMB. The communications in MMB may coexist with current cellular systems (e.g., 4G, 3G, and the like). A mobile station can hand over to an existing 3G or 4G cellular system in situations where the mobile station is in a coverage "hole" in the MMB system, or the signal strength from the base stations in MMB is not strong enough. Base stations in MMB can include different sizes with an overlay hierarchical network structure, where small cells can be overlaid by large cells.

In systems with directional antennas or antenna arrays, one of the challenges is that the link or connection between transmitter and receiver can be broken or weakened due to reasons such as obstacles blocking the line of sight or the good paths of non-line of sight. In such situations, the reliability of the communication may not be well provisioned. This disclosure solves the problems of how to enhance reliability in a system with directional antennas or antenna arrays.

The embodiments disclosed herein primarily describe communication between base stations and mobile stations (e.g., base station to mobile station transmission). Those skilled in the art will recognize that the disclosed embodiments are also applicable for communications between base stations (e.g., base station to base station transmission), and for communications between mobile stations (e.g., mobile station to mobile station communication). The embodiments disclosed herein are applicable for communication systems with large number of antennas, such as systems in MMB, RF band, and the like.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
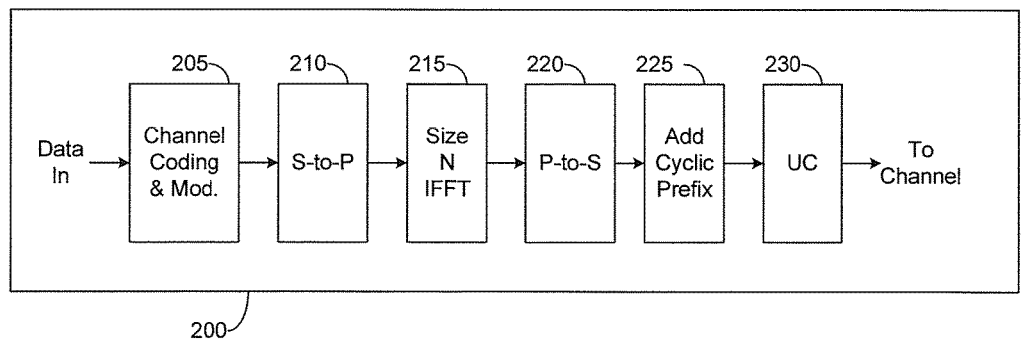
FIG. 2A is a high-level diagram of an orthogonal frequency division multiple access (OFDMA) or millimeter wave transmit path, according to embodiments of this disclosure.
Figure 2B:
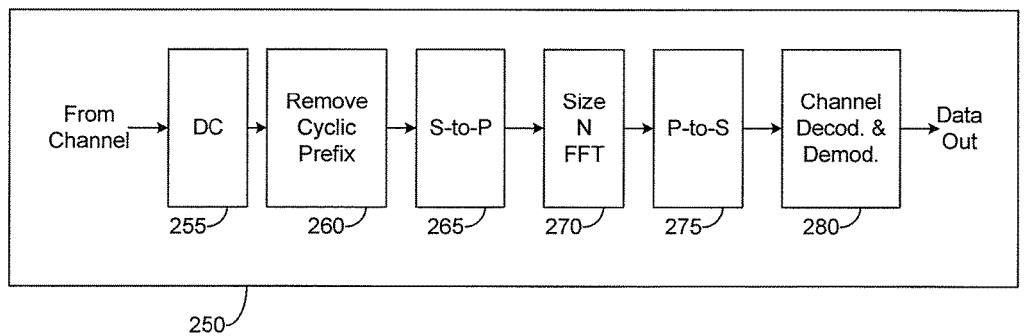
FIG. 2B is a high-level diagram of an OFDMA or millimeter wave receive path, according to embodiments of this disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors 150, 152.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In one embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times.

Multicast and unicast data and control signals and messages can be transmitted in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3A:
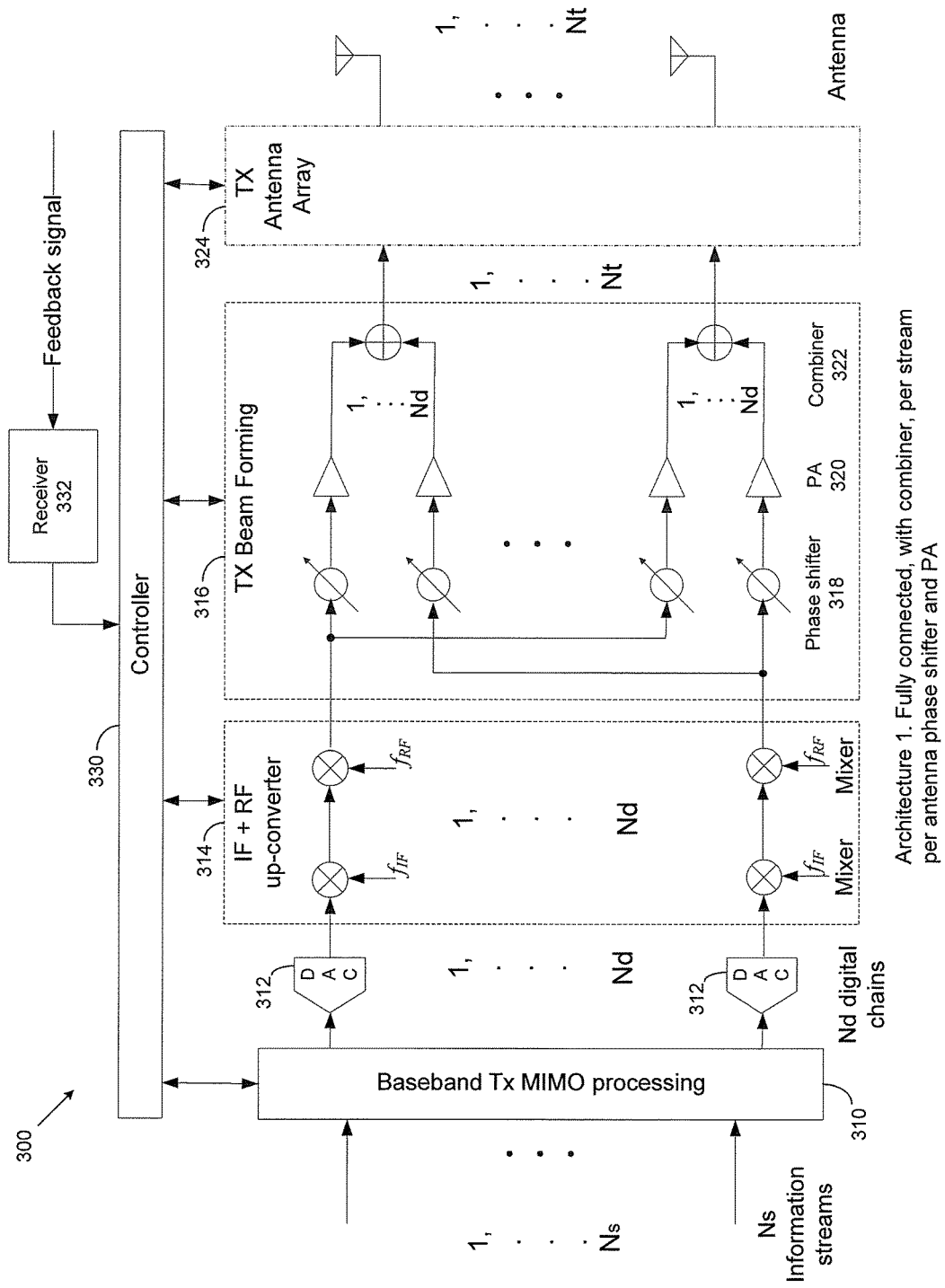
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
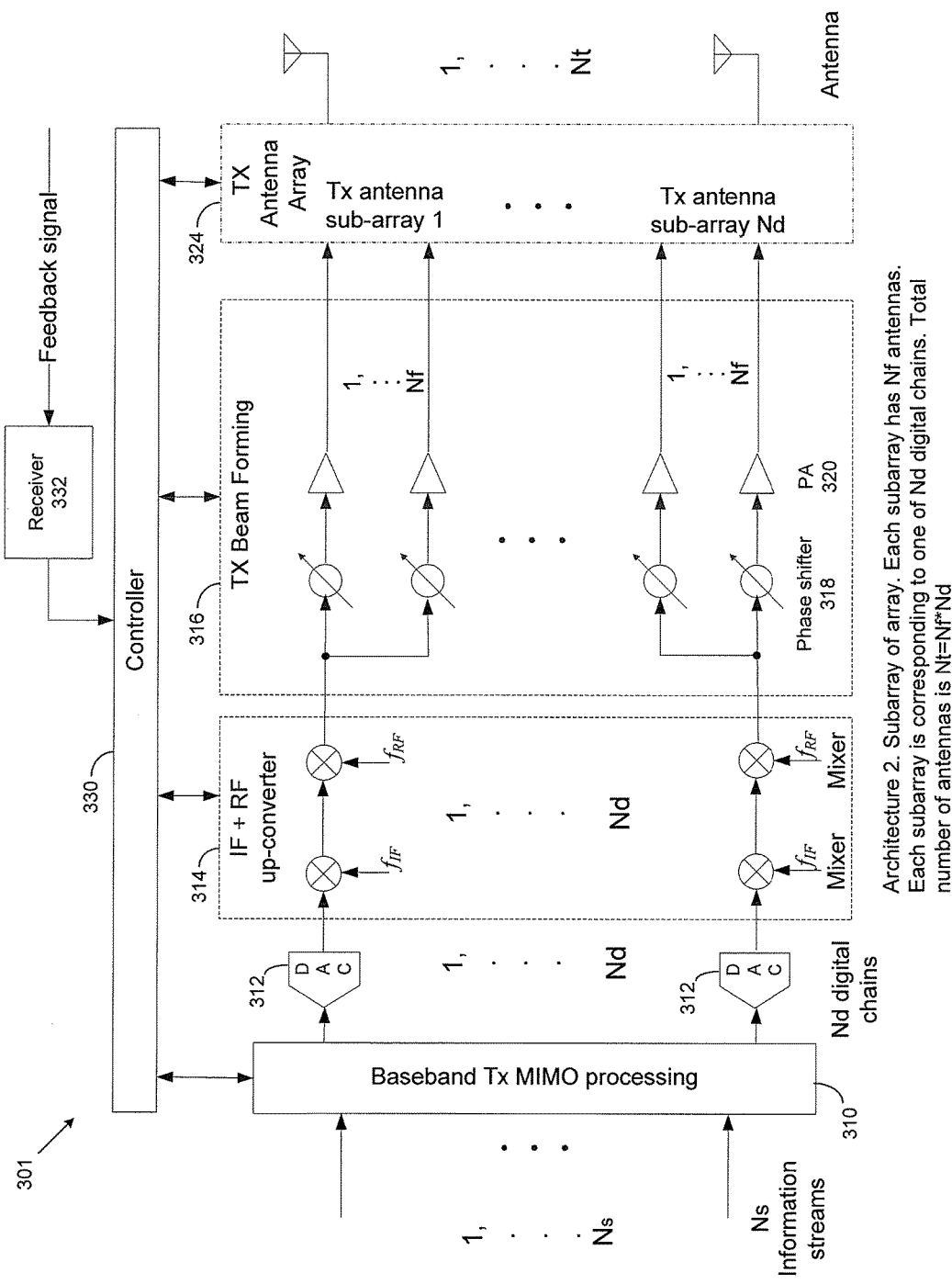
FIG. 3B illustrates another transmit path for MIMO baseband processing and analog beam forming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
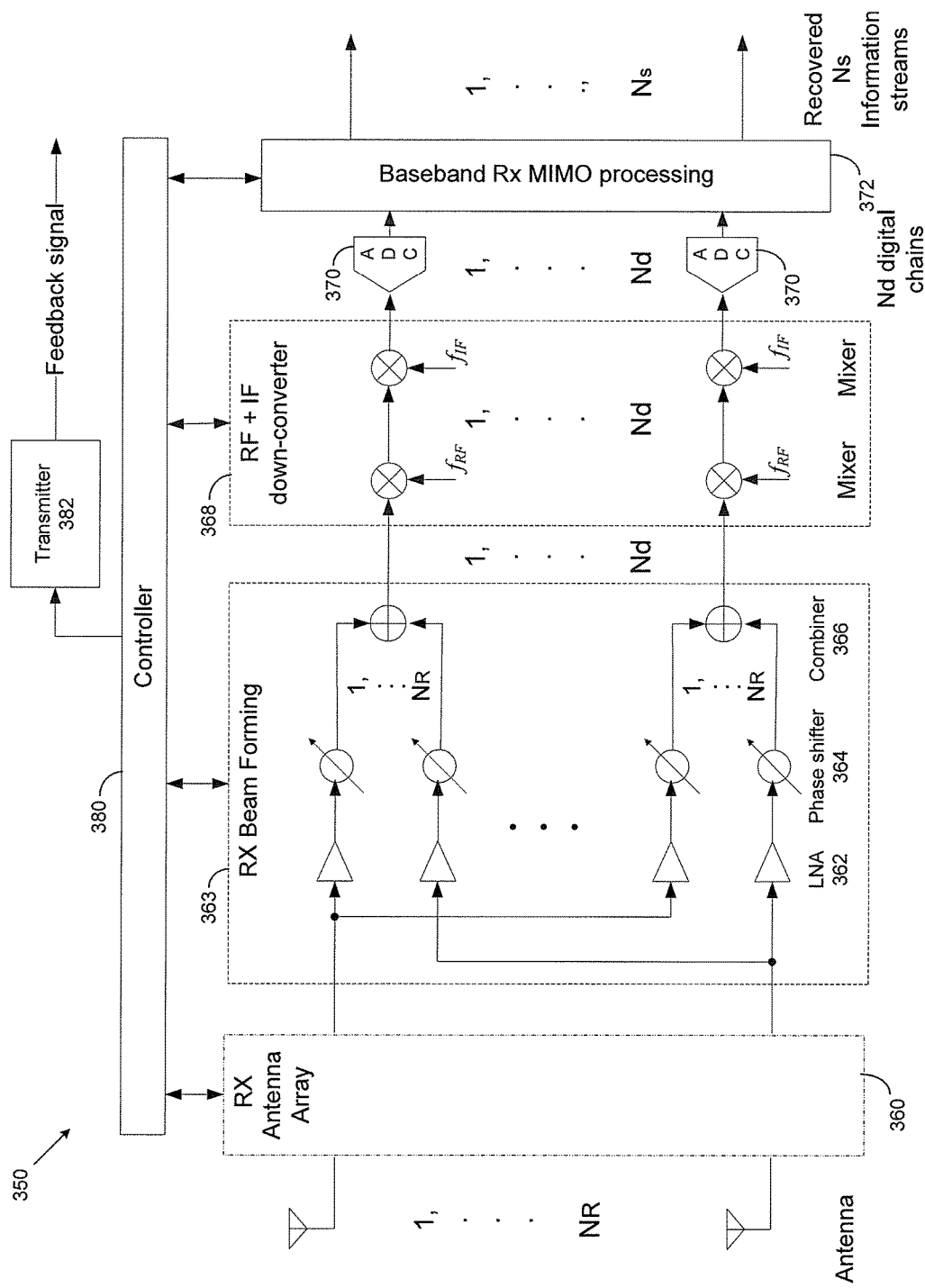
FIG. 3C illustrates a receive path for MIMO baseband processing and analog beam forming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
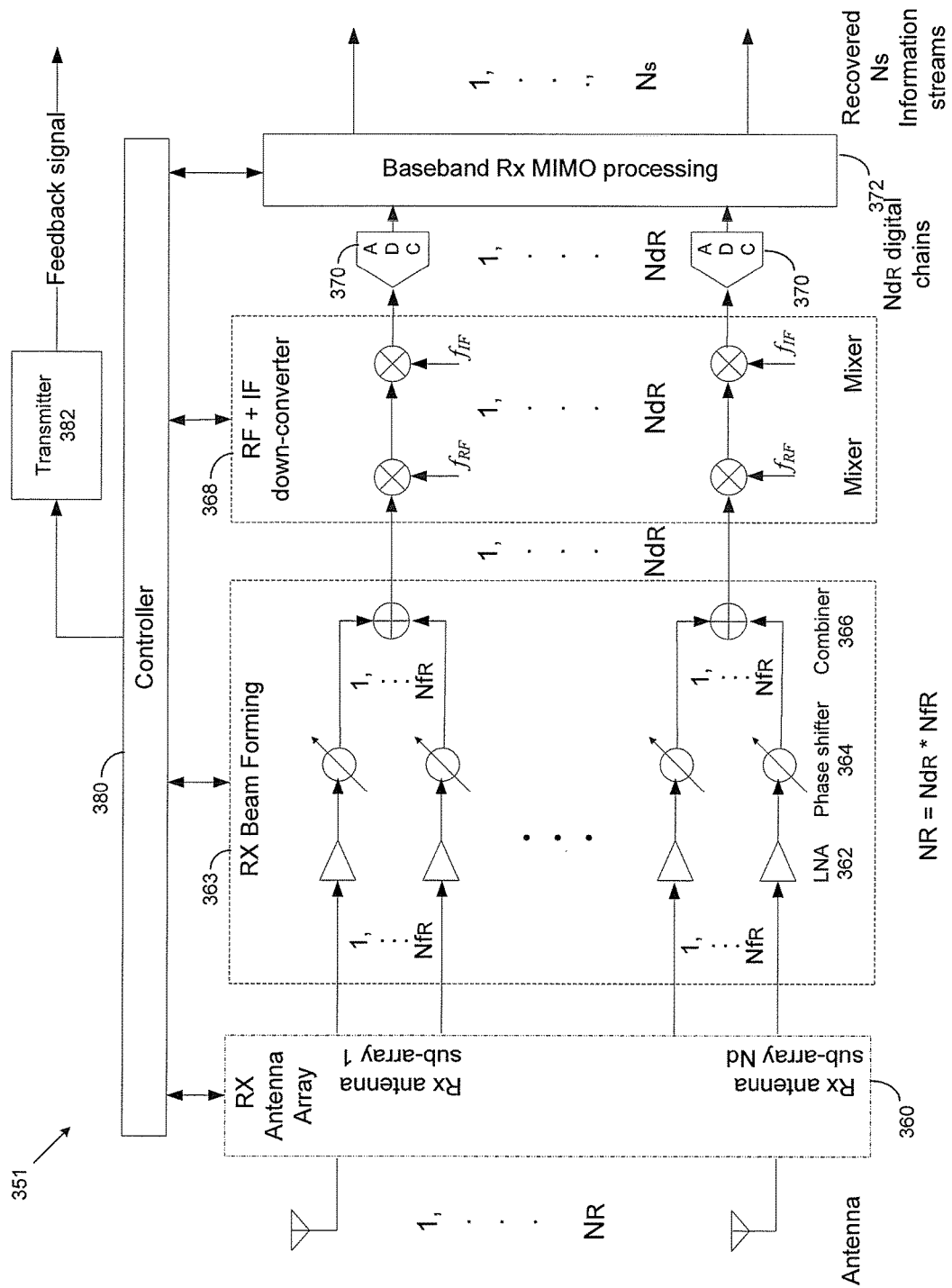
FIG. 3D illustrates another receive path for MIMO baseband processing and analog beam forming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream which can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF downconverter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
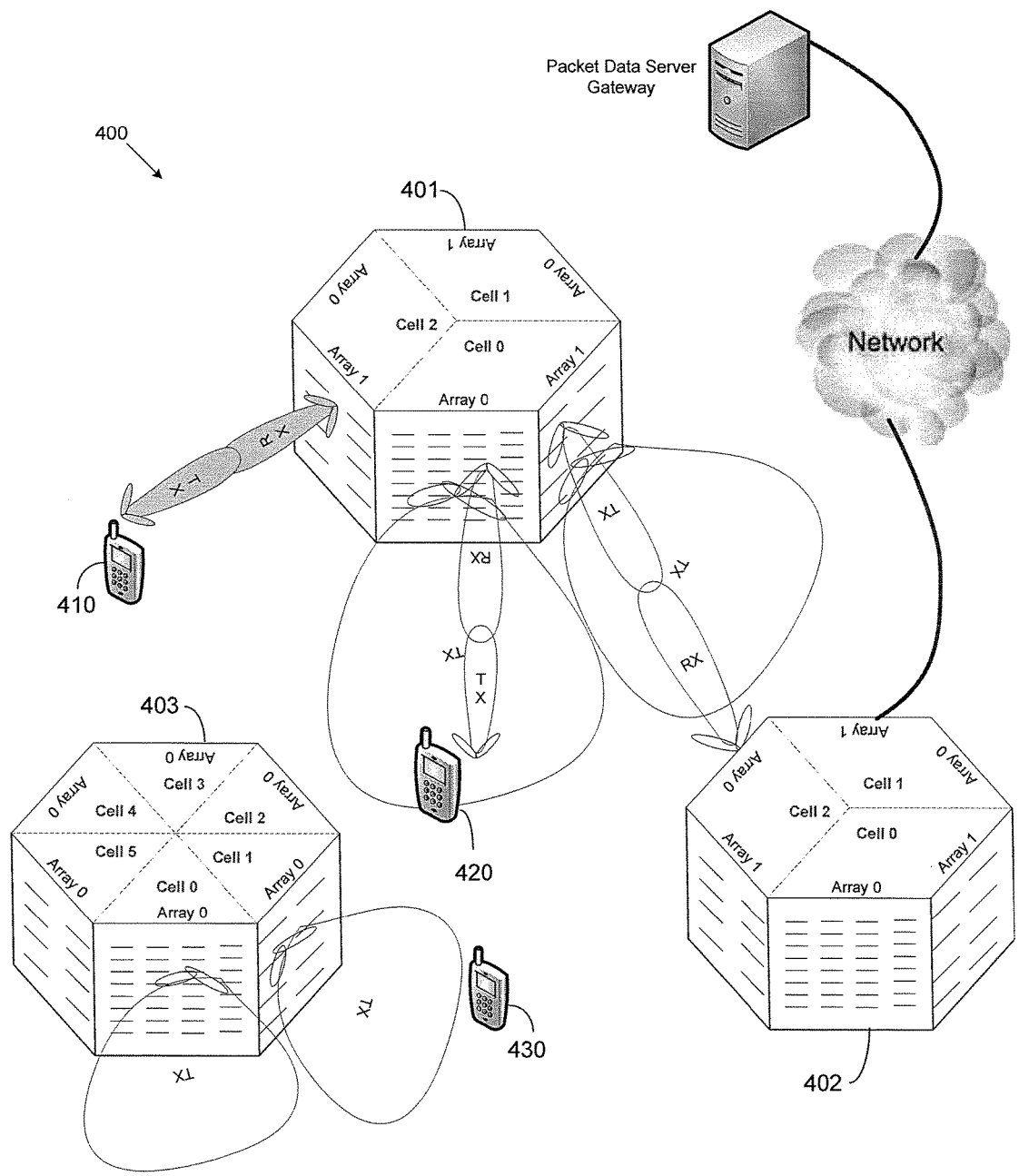
FIG. 4 illustrates a wireless communication system using antenna arrays, according to an embodiment of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 may receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere may be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

Figure 5:
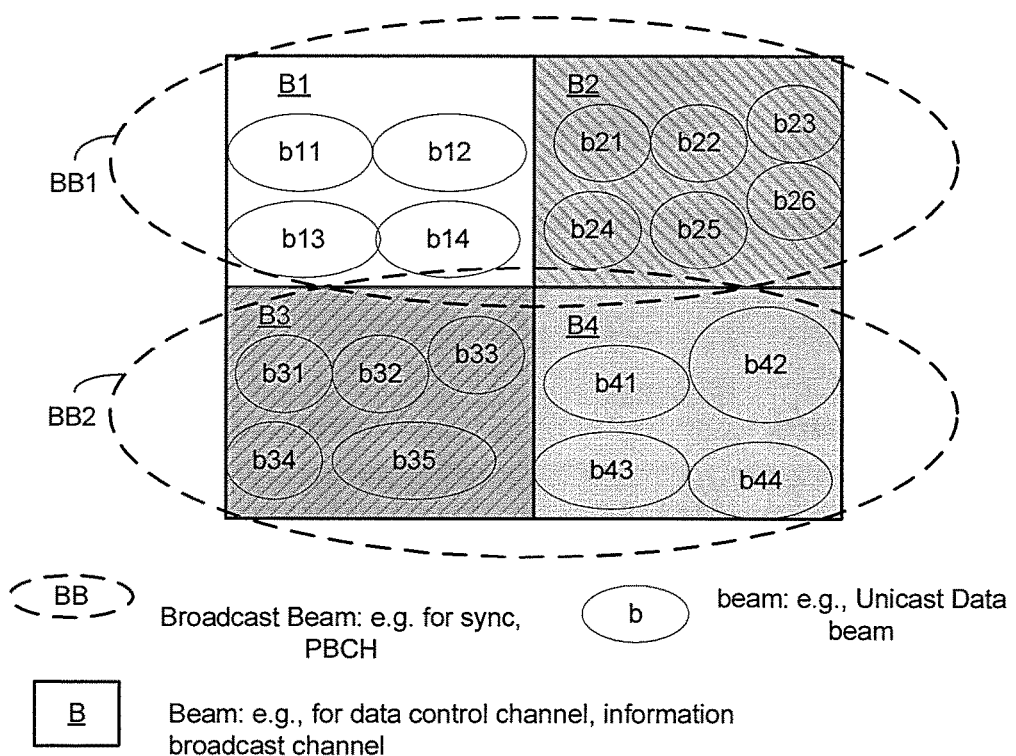
FIG. 5 illustrates an example of different beams having different shapes for different purposes in a sector or a cell, according to an embodiment of this disclosure.

FIG. 5 illustrates an example of different beams having different shapes and different beam widths for different purposes in a sector or a cell, according to one embodiment of this disclosure. The embodiment illustrated in FIG. 5 is for illustration only. Other embodiments could be used without departing from the scope of this disclosure. The sector/cell shown in FIG. 5 may represent one or more of the base station cells depicted in FIG. 4.

FIG. 5 shows different beams illustrated in two dimensions: in azimuth and elevation. For example, the horizontal dimension may be for angles for azimuth, and the vertical dimension may be for angles in elevation, or vice versa. The beams can be in three dimensions (e.g., like a cone), however for ease of illustration, FIG. 5 only shows two dimensions. Throughout the disclosure, the beams (including TX beams and RX beams) can have various beam widths or various shapes, including regular or irregular shapes, not limited by those in the figures.

In a sector or a cell, one or multiple arrays with one or multiple RF chains can generate beams in different shape for different purposes. In FIG. 5, the vertical dimension can represent elevation, and the horizontal dimension can represent azimuth. As shown in FIG. 5, wide beams BB1, BB2 (also called broadcast beams, or "BB") may be configured for synchronization, physical broadcast channel, or a physical configuration indication channel that indicates where the physical data control channel is located, etc. The wide beams BB1, BB2 can carry the same information for the cell.

Although two wide beams BB1, BB2 are illustrated in FIG. 5, a cell may be configured for one or multiple BBs. When there are multiple BBs in a cell, the BBs can be differentiated by implicit or explicit identifier, and the identifier can be used by the MS to monitor and report BBs. The BB beams can be swept and repeated. The repetition of the information on BB beams may depend on the MS's number of RX beams to receive the BB beam. That is, in one embodiment, the number of repetitions of the information on BB beams may be no less than the number of RX beams at the MS to receive the BB beam.

Wide control channel beams B1-B4 (collectively, "B beams") can be used for control channels. Control channel beams B1-B4 may or may not use the same beam width as wide beams BB1, BB2. Beams B1-B4 may or may not use the same reference signals as wide beams BB1, BB2 for the MS to measure and monitor. Wide beams B1-B4 are particularly useful for a broadcast or multicast to a group of MSs, as well as control information for certain MS, such as MS-specific control information, e.g., the resource allocation for a MS.

Although four control channel beams B1-B4 are illustrated in FIG. 5, a cell may be configured for one or multiple B beams. When there are multiple B beams in a cell, the B beams can be differentiated by implicit or explicit identifier, and the identifier can be used by the MS to monitor and report the B beams. The B beams can be swept and repeated.

The repetition of the information on B beams can be depending on the MS's number of RX beams to receive the B beam. That is, in one embodiment, the number of repetitions of the information on B beams may be no less than the number of RX beams at the MS to receive the B beams. A MS may or may not search for beams B1-B4 by using the information on beams BB1, BB2.

Beams b11-b44 (collectively, "b beams") may be used for data communication. A b beam may have an adaptive beam width. For some MSs (e.g., a MS with low speed), a narrower beam can be used, and for some MSs, a wider beam can be used. Reference signals can be carried by b beams. Although nineteen b beams are illustrated in FIG. 5, a cell may be configured for one or multiple b beams. When there are multiple b beams in a cell, the b beams can be differentiated by implicit or explicit identifier, and the identifier can be used by the MS to monitor and report the b beams. The b beams can be repeated. The repetition of the information on the b beams may depend on the MS's number of RX beams to receive the b beam. That is, in one embodiment, the number of repetitions of the information on b beams may be no less than the number of RX beams at the MS to receive the b beams. A TX beam b can be locked with a RX beam after the MS monitors the beams. If the data information is sent over a locked RX beam, the repetition of the information on the b beam may not be needed.

In accordance with an embodiment of this disclosure, when a current link between a MS and a BS is under conditions such that the link may be lost or broken, the MS or the network can recover the current link. If the current link is lost or broken, the MS or the network can try to establish a link by recovering the current link, or establishing a new link according to one of a number of switching rules. The switching rules include: (i) switching to another beam in the same control channel, (ii) switching to one or more beams in another control channel, (iii) switching to a cell that is at the same cell site as the current cell, (iv) switching to a cell at another cell site with a wired backhaul link, and (v) switching to a cell at another cell site with a wireless backhaul. The switching rules are ordered according to a priority among the switching rules, as discussed in greater detail below.

The MS or the network can maintain a list of the candidate beams and/or cells based on the measurement and the topology information, such as cell sites and backhaul conditions (e.g., wired or wireless). Candidate beam priority can be assigned according to whether the candidate beam is in the same control channel, the same cell, the same cell site as the current beam, a cell with wired backhaul, or a cell with a wireless backhaul. These may be ordered in descending priority order. A determination of which beam would have a higher priority can also be made jointly with a measurement of signal strength, etc. For example, the beams with higher signal strength can be candidates with higher priority. If some candidate beams have a similar signal strength (e.g., the difference in signal strength between candidate beams is within a threshold), then the priority order can be determined by whether the candidate beam is in the same control channel, the same cell, the same cell site as the current beam, a cell with wired backhaul, or a cell with a wireless backhaul, which may be ordered in descending priority order.

Figure 6:
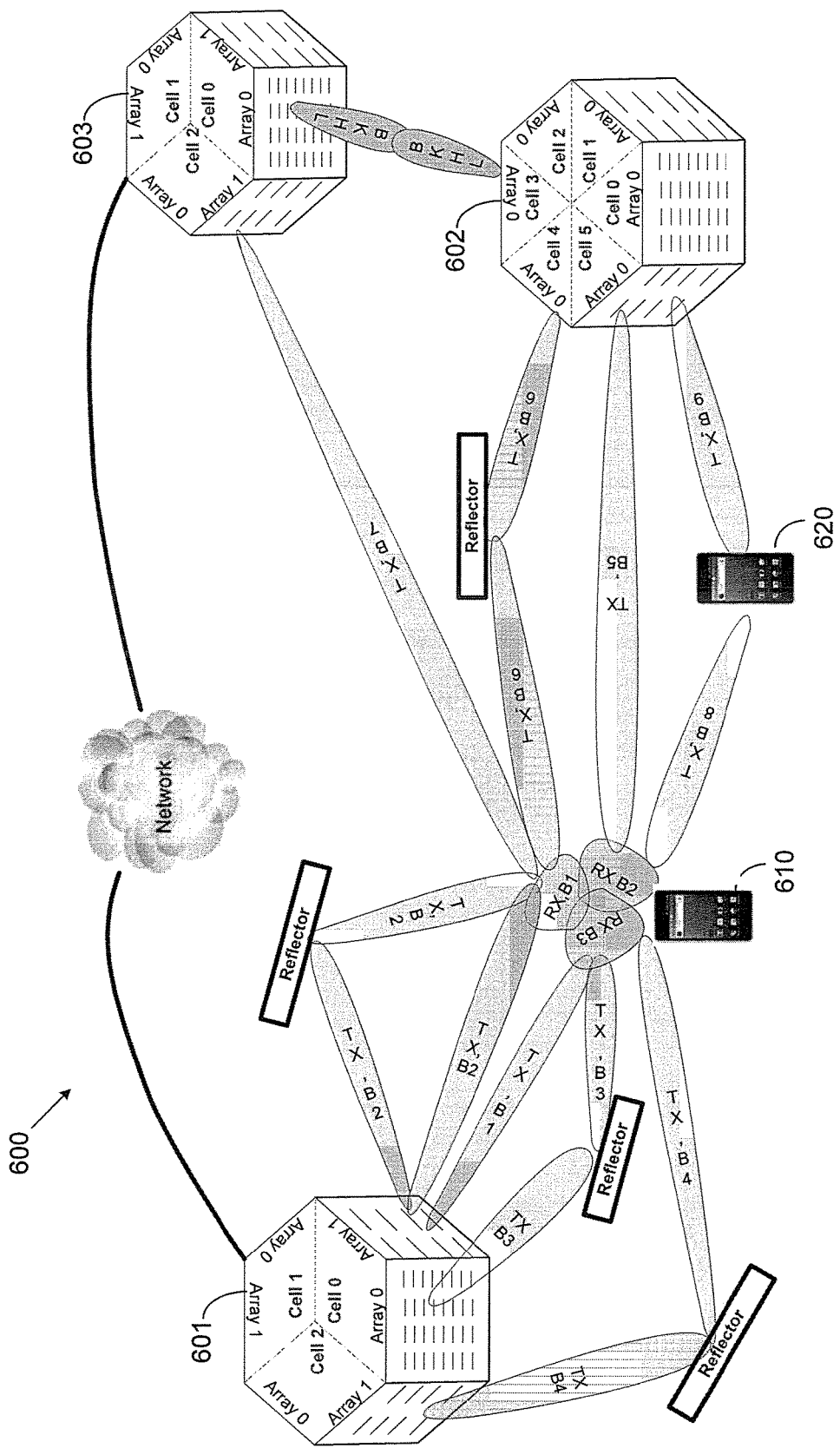
FIG. 6 illustrates an example of current beams and candidate beams and cells based on topology, according to an embodiment of this disclosure.

FIG. 6 illustrates an example of current beams and candidate beams and cells based on topology, according to an embodiment of this disclosure. The embodiment of wireless communication system 600 illustrated in FIG. 6 is for illustration only. Other embodiments of the wireless communication system 600 could be used without departing from the scope of this disclosure.

As shown in FIG. 6, system 600 includes base stations 601-603 and mobile stations 610, 620. Base stations 601-603 may represent one or more of base stations 101-103 of FIG. 1 or base stations 401-403 of FIG. 4. Likewise, mobile stations 610, 620 may represent one or more of subscriber stations 111-116 of FIG. 1 or subscriber stations 410-430 of FIG. 4.

MS 610 may receive one or multiple beams from one or multiple BSs 601-603, over its one or multiple RX beams. For the purpose of this example, it is assumed that MS 610 has a best connection with BS 601 Cell 0 through transmission beam TX B1 and receive beam RX B3. MS 610 also monitors the other beams that MS 610 can receive. MS 610 can determine that BS 601 Cell 0 TX B2 and B3 are from the same cell as its current best connection, i.e., BS 601 Cell 0 TX B1. Accordingly, MS 610 can place BS 601 Cell 0 TX B2 and BS 601 Cell 0 TX B3 as candidate beams in higher priority, because a switch to either BS 601 Cell 0 TX B2 or BS 601 Cell 0 TX B3 would not necessitate a cell switch (i.e., all three beams are associated with the same cell BS 601 Cell 0).

If TX B1 and TX B2 are associated with the same control channel, but TX B1 and TX B3 are associated with different control channels, TX B2 may be assigned a higher priority as a candidate than TX B3 because a switch to TX B2 would not require a control channel switch, whereas a switch to TX B3 would include a control channel switch. Similarly, BS 601 Cell 2 TX B4 can be assigned as candidate beams with a second level of priority, because a beam switch from Cell 0 to Cell 2 of BS 601 includes a cell switch, but would not require a backhaul data delivery from Cell 0 to Cell 2 since they are at the same cell site.

The beam from BS 603 Cell 2 TX B7 is a candidate beam for beam switching that can be assigned a third level of priority because a beam switch to BS 603 Cell 2 TX B7 includes a cell site switch (from BS 601 to BS 603), but BS 603 has a wired backhaul. The beams from BS 602 TX B5 and B6 are candidate beams that can be assigned a fourth level of priority because BS 602 has a wireless backhaul, and a switch to BS 602 may introduce additional delay and cost for backhaul data transferring if the current beam should be switched to BS 602 TX B5 or B6. At a lowest level of priority, a switch to TX B9 and TX B8 would use MS 620 to relay the information to MS 610. This route may have the lowest priority due to the cost of relaying the information through another MS.

The beam from the base station can be a beam containing a synchronization channel, or a beam with a broadcast channel, or a beam with a data control channel, or even a data beam. In this example, the candidate beam priority is determined according to whether the candidate beam is in the same control channel, the same cell, the same cell site as the current beam, a cell with wired backhaul, or a cell with a wireless backhaul, where these are ordered in descending priority order. A determination of which beam would have a higher priority can also be made jointly with a measurement of signal strength, etc. For example, the beams with higher signal strength can be candidates with higher priority. If some candidate beams have a similar signal strength (e.g., the difference in signal strength between candidate beams is within a threshold), then the priority order can be determined by whether the candidate beam is in the same control channel, the same cell, the same cell site as the current beam, a cell with wired backhaul, or a cell with a wireless backhaul, which may be ordered in descending priority order.

Figure 7:
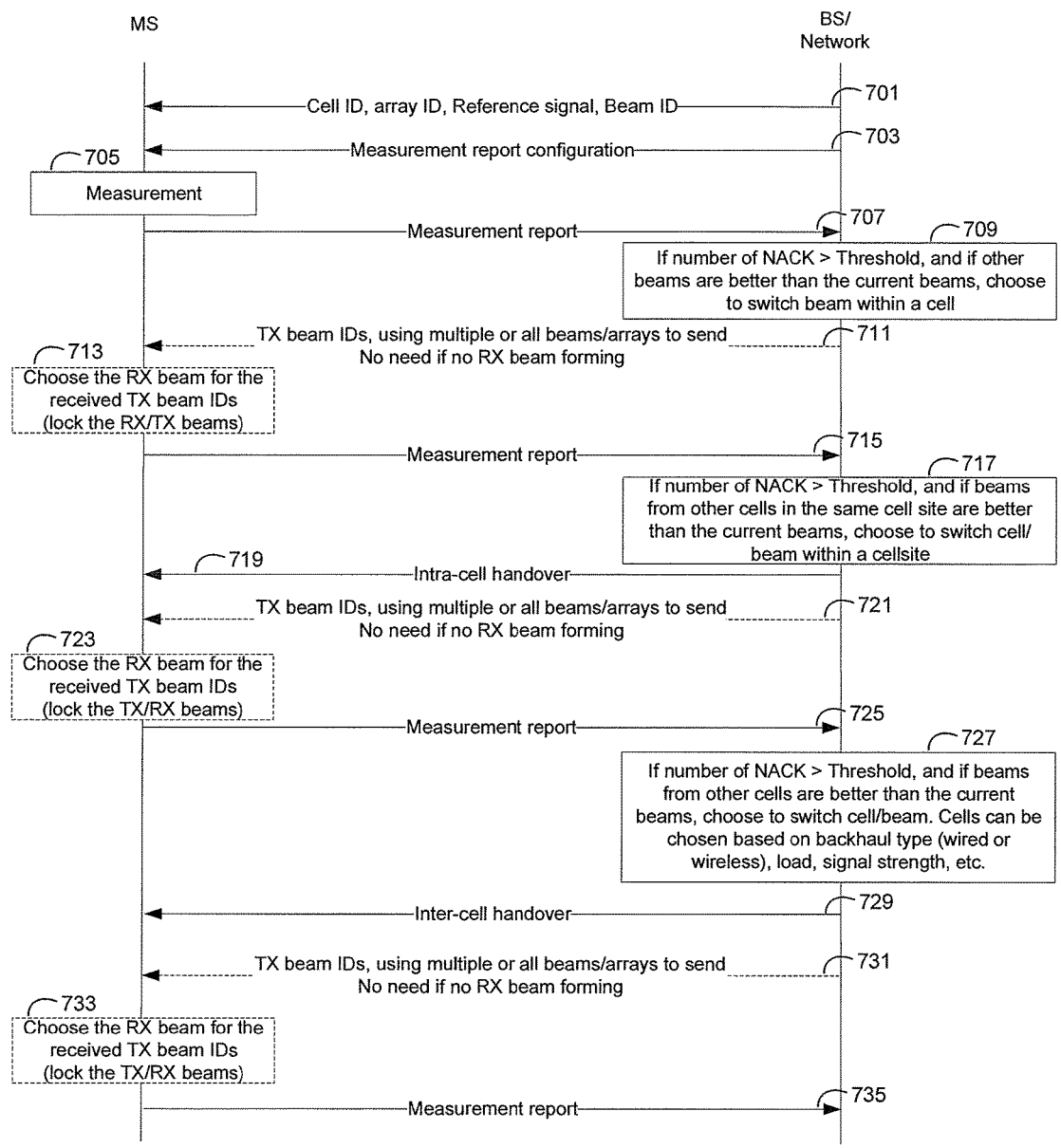
FIG. 7 illustrates an example flow diagram of network controlled beam/cell switching for reliability enhancement, according to an embodiment of this disclosure.

FIG. 7 illustrates an example flow diagram of network controlled beam/cell switching for reliability enhancement, according to an embodiment of this disclosure. The flow diagram illustrated in FIG. 7 is for illustration only. Other embodiments of the flow diagram could be used without departing from the scope of this disclosure.

In the embodiment of FIG. 7, each antenna array is configured to steer its beams, and the MS can measure the beams and report back to the network information about the beam quality. If the current link of the MS becomes unsatisfactory, one or more other beams with higher quality (if any) in the same array can be selected and used for communication. These can be narrow or wide beams. One or more other beams from other arrays can also be used. One or more beams from the arrays in a different cell at the same cell location can also be used. Or one or more beams from the arrays in a different cell at a different cell site can be used. The beams may include a beam associated with a synchronization channel, a beam associated with a broadcast channel, a beam associated with a data control channel, or a data beam.

In operation 701, the BS or the network sends one or more of a physical cell ID, array ID, identification for beams (e.g., beam ID), and reference signals, to the MS. In operation 703, the BS or the network may also send the measurement configuration to the MS. In operation 705, the MS performs the measurement, and in operation 707, the MS sends the measurement report to the BS or the network. The measurement report may include, e.g., the best pair of BS TX beam and MS RX beam, multiple good pairs of BS TX beam and MS RX beam, etc., and the signal strength (SINR, SNR, etc.).

If certain conditions are met, the BS selects other beams within the cell for the MS (operation 709). The conditions may include, for example, that the number of NACKs is greater than a threshold, and other beams are better (that is, better by a certain value, e.g., several dBs in signal strength or SINR, etc.) than the current beam based on the measurement report, etc.

In operation 711, the BS or the network sends the TX beam IDs to be switched to, to the MS. If the beam to be switched is a TX data beam, the information of the TX beam ID to be switched can be included in the message of scheduling information. If the beam to be switched is a TX data control beam, the information can be included in a message. The message can also include when the specified TX beam IDs will be used (e.g., after how many subframes, frames, superframes, etc., or at which subframe, frame, superframe, etc., the switch will occur). To increase the reliability that the MS will receive the message, the BS may send multiple copies of the message, or the BS may send the message using multiple beams or arrays.

Once the MS receives the TX beam IDs that the BS will be switching to, the MS locks its RX beam towards the TX beam ID (operation 713). The MS can lock the RX beam based on its previous measurement. For example, the MS can examine the measurement and determine which RX beam is the best for the TX beam with the TX beam ID indicated by the BS, which the BS will use in the following transmission.

If the MS does not have RX beam forming, and the beam to be switched is a data beam, then the BS may not need to send the TX beam IDs to the MS, because the MS does not need to lock its RX beam towards the TX beam. However, if the beam to be switched is a control beam, then the TX beam ID for the control beam may be required in the message to the MS.

The BS uses the TX beam IDs at the specified time to send information to the MS. If the beam is a control beam, such as a data control beam, then the MS may send a confirmation that the MS receives the message about the BS TX control beam switch (operation 715), and the BS can use the TX beam IDs to send information to the MS, after the BS receives the confirmation. The MS can then communicate with the BS at the new BS TX beam. The MS can perform measurement when needed.

If certain conditions are met, the BS selects other cells in the same cell site (operation 717). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use, etc.

In such a situation, an intra cell handover, which is to switch the current cell to another cell in the same cell site, may be performed (operation 719). The MS can report the measurement on the pairs of neighboring cells' TX beams (e.g., beams for the synchronization channel or broadcast channel, or data control beam) and corresponding RX beams. The BS can select which cell the MS should switch to. In operation 721, the BS sends a message to the MS, where the message can include the information of the target cell's physical ID or the target cell's TX beam IDs (e.g., beams for the synchronization channel or broadcast channel, or data control beam).

The MS receives the message, and then locks its RX beam towards the target cell's TX beam with the received target cell TX beam ID (operation 723). The MS may lock its RX beam based on its previous measurement. For example, the MS may select a good RX beam such that the pair of the RX beam and target cell's TX beam with the received TX beam ID exhibits good quality.

In operation 725, the MS may send confirmation on whether the message including the target cell, target cell TX beam IDs, etc., is received. After the BS receives the confirmation, the intra-cell handover may be performed. The MS may perform network re-entry to the target cell. The current cell of the MS may transfer the communication context to the target cell.

If certain conditions are met, the BS selects cells in a different cell site (operation 727). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use or in the cells within the same cell site as the current cell, etc. The cell selection may also include consideration of the factor of the cell load, whether the cell has a wired backhaul or a wireless backhaul (a cell wireless backhaul may be assigned a lower priority due to its delay and cost), signal strength, etc.

In such a situation, an inter cell handover, which is to switch the current cell to another cell in the different cell site, can be performed (operation 729). The MS reports the measurement on the pairs of neighboring cells' TX beams (e.g., beams for the synchronization channel or broadcast channel, or data control beam) and corresponding RX beams. The BS selects which cell the MS should switch to. In operation 731, the BS sends a message to the MS, where the message can include the information of the target cell's physical ID or the target cell's TX beam IDs (e.g., beams for the synchronization channel or broadcast channel, or data control beam).

The MS receives the message, and then locks its RX beam towards the target cell's TX beam with the received target cell TX beam ID (operation 733). The MS may lock its RX beam based on its previous measurement. For example, the MS may select a good RX beam where the pair of the RX beam and target cell's TX beam with the received TX beam ID exhibits good quality.

In operation 735, the MS sends confirmation on whether the message including the target cell, target cell TX beam IDs, etc., is received. After the BS receives the confirmation, the inter-cell handover may be performed. The serving cell may deliver the communication context to the target cell.

In an alternative embodiment of the present disclosure, the TX beam IDs are not sent, the MS performs RX beam forming, and the BS TX may repeat the information multiple times when the MS steers its RX beams to attempt to receive the information. Once the MS determines which RX to use, then the TX/RX beam can be locked. For the TX side, the overhead is either repeating the information multiple times, or sending the TX beam IDs. For the RX side, the overhead is either a steering of RX beams, or receiving the TX beam IDs and performing a lock. For the uplink, in order to preserve the MS's battery capacity, it may be preferable to not send the TX beam IDs.

In an embodiment of the present disclosure, the MS monitors beams, arrays, and cells. An active set is maintained for possible candidates of other beams, arrays, and cells. Higher priorities can be set for beams, arrays in the same cell, and cells at the same cell site, to avoid backhaul signaling due to the context delivery. The BS or the network can unicast the active set to MS, based on the measurement report from the MS, and other factors such as load, BS backhaul conditions such as wired or wireless, backhaul delays, etc. The active set can include the candidates in sorted order with the higher priority candidates at the beginning and lower priorities candidates toward the end, so that the MS can know the network's preference.

In an embodiment of the present disclosure, the MS determines the active set independently. The network may send topology information to the MS, including: cells at the same cell site, beams for remote radio heads that have the same cell ID as the cell, neighboring cells at different cell sites. The network may also indicate if the cell sites are connected by wireless backhauling (wireless backhauling cell sites may be prioritized lower than other cells), cell load, backhaul delays, etc. The MS can use the topology information to determine the priorities of all the candidates in the set and sort the candidates according to the priority.

Figure 8:
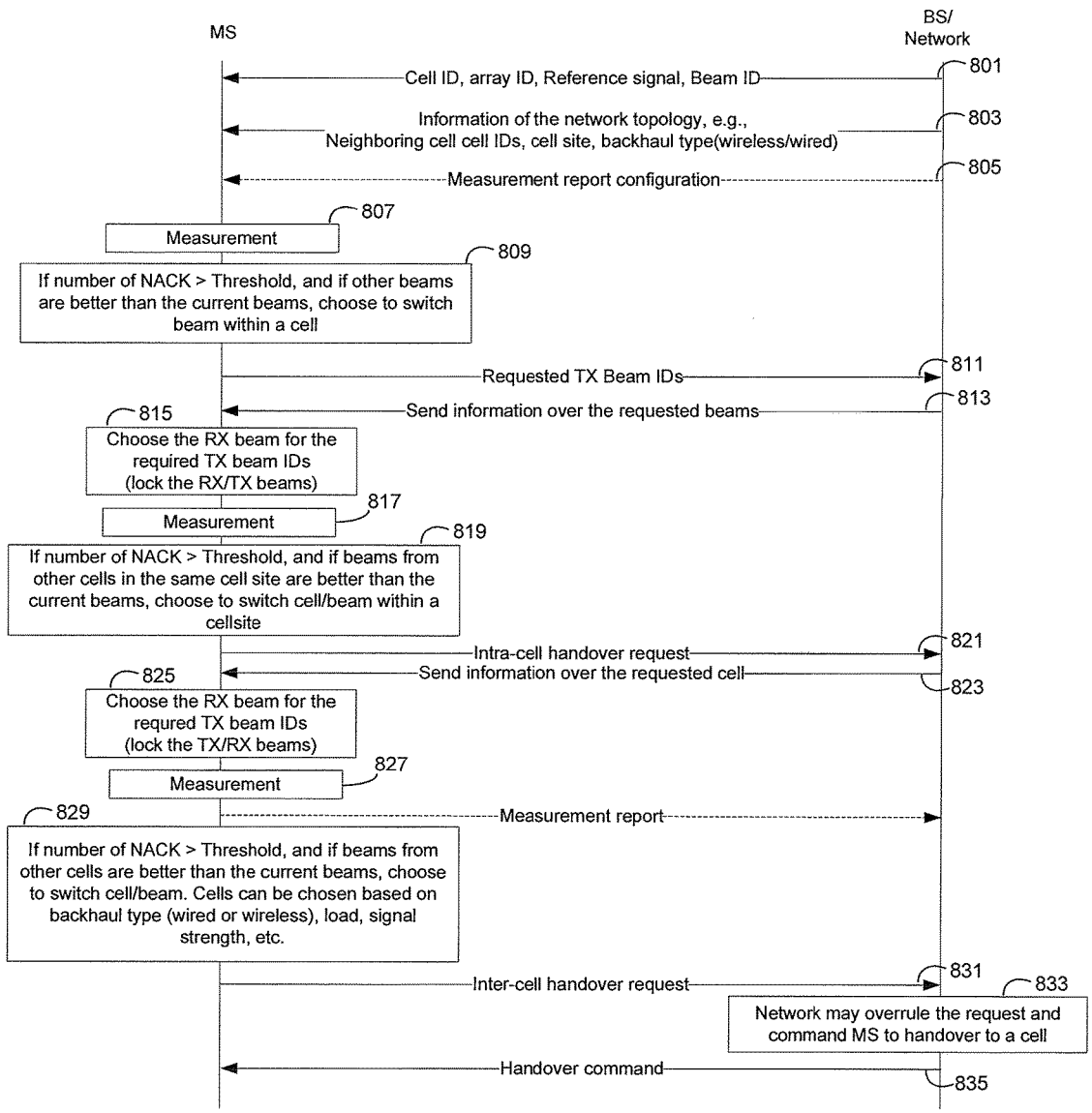
FIG. 8 illustrates an example flow diagram of MS assisted beam/cell switching for reliability enhancement, according to an embodiment of this disclosure.

FIG. 8 illustrates an example flow diagram of MS assisted beam/cell switching for reliability enhancement, according to an embodiment of this disclosure. The flow diagram illustrated in FIG. 8 is for illustration only. Other embodiments of the flow diagram could be used without departing from the scope of this disclosure.

In operation 801, the BS or the network sends one or more of a physical cell ID, array ID, identification for beams (e.g., beam ID), or reference signals, to the MS. In operation 803, the BS or the network sends information of the network topology to the MS, including cell IDs, cell sites, and backhaul types (wireless or wired, and if wireless then the number of hops in the backhaul from the BS to the network), of the neighboring cells, etc. In operation 805, the BS or the network may also send the measurement configuration to the MS. In operation 807, the MS performs the measurement, and sends the measurement report to the BS or the network. The measurement report may include, e.g., the best pair of BS TX beam and MS RX beam, multiple good pairs of BS TX beam and MS RX beam, etc., and the signal strength (e.g., SINR, SNR, etc.).

If certain conditions are met, the MS selects other beams within the cell (operation 809). The conditions may include, for example, that the number of NACKs is greater than a threshold, and other beams are better (that is, better by a certain value, e.g., several dBs in signal strength or SINR, etc.) than the current beam based on the measurement, etc. The MS then sends a request to the BS or the network regarding the beam switching, where the request may include the selected BS TX beam IDs (operation 811).

The BS or the network sends information on the beam with the MS requested BS TX beam IDs, to the MS. If the beam to be switched is a TX data beam, the timing of the TX beam ID to be switched to may be included in the message of scheduling information. If the beam to be switched is a TX data control beam, the BS or the network may send a message that includes when the specified TX beam IDs will be used (e.g., after how many subframes, frames, superframes, etc., or at which subframe, frame, superframe, etc., the switch will occur). To increase the reliability that the MS will receive the message, the BS may send multiple copies of the message, or the BS may send the message using multiple beams or arrays. The MS may then send a confirmation about the message for the data control beam switch.

In operation 813, the BS or the network sends information on the beam with the MS requested BS TX beam IDs, at the specified time, or at a time determined by the BS or the network.

The MS locks its RX beam towards the requested TX beam ID (operation 815). The MS can lock the RX beam based on its previous measurement. For example, the MS can examine the measurement and determine which RX beam is the best for the TX beam with the TX beam ID indicated by the BS, which the BS will use in the following transmission. The MS then communicates with the BS at the new BS TX beam. The MS can perform measurement when needed (operation 817).

If certain conditions are met, the MS selects other cells in the same cell site (operation 819). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use, etc.

In such a situation, an intra cell handover, which is to switch the current cell to another cell in the same cell site, may be performed. The MS can report the measurement on the pairs of neighboring cells' TX beams (e.g., beams for the synchronization channel or broadcast channel, or data control beam) and corresponding RX beams. The MS can select which cell the MS should switch to.

In operation 821, the MS sends a message to the BS or the network, where the message can include the information of the target cell's physical ID or the target cell's TX beam IDs (e.g., beams for the synchronization channel or broadcast channel, or data control beam). In operation 823, the BS sends a confirmation to the MS. The MS can send another confirmation back. The MS can then perform network re-entry to the target cell. The current cell of the MS transfers the communication context to the target cell.

The BS or the network can also overrule the request from the MS about the target cell. For example, if the MS sends a measurement report to the BS or the network, the BS and network can use the information to make a decision. The BS or the network can send a handover command to the MS, where the command includes the information on the target cell.

The MS locks its RX beam towards the target cell's TX beams (operation 825). The MS may lock its RX beam based on its previous measurement. For example, the MS may select a good RX beam such that the pair of the RX beam and target cell's TX beam exhibits good quality. The MS can start the network re-entry process. The MS can perform measurement when needed (operation 827).

If certain conditions are met, the MS selects cells in a different cell site (operation 829). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use or in the cells within the same cell site as the current cell, etc. The cell selection may also include consideration of the factor of the cell load, whether the cell has a wired backhaul or a wireless backhaul (a cell wireless backhaul may be assigned a lower priority due to its delay and cost), signal strength, etc.

In such a situation, an inter cell handover, which is to switch the current cell to another cell in the different cell site, can be performed. The MS reports the measurement on the pairs of neighboring cells' TX beams (e.g., beams for the synchronization channel or broadcast channel, or data control beam) and corresponding RX beams. The BS or the MS can select which cell the MS should switch to.

In operation 831, the MS sends a message to the BS or the network, where the message can include the information of the target cell's physical ID or the target cell's TX beam IDs (e.g., beams for the synchronization channel or broadcast channel, or data control beam). If the network or the BS does not agree, the network or the BS can overrule the decision made by the MS, and the BS picks up the target cell (operation 833). The BS sends a handover command to the MS, where the handover command includes the target cell information (operation 835).

The MS receives the message, and then locks its RX beam towards the target cell's TX beam. The MS may lock its RX beam based on its previous measurement. For example, the MS may select a good RX beam where the pair of the RX beam and target cell's TX beam exhibits good quality.

The MS sends confirmation on whether the message including the target cell, target cell TX beam IDs, etc., is received. After the BS receives the confirmation, the inter-cell handover may be performed. The serving cell may deliver the communication context to the target cell. The MS can perform a network re-entry to the target cell.

In an embodiment of the present disclosure, multiple BSs send the same information to the MS, to increase the reliability. Multiple BSs can have the same copy of data. Or multiple BSs can dynamically or semi-dynamically have the same copy of the data. For example, when the MS has a bad connection, the MS reports to the network, and the network then sends multiple copies of the data to multiple BSs.

In an embodiment of the present disclosure, to enhance the reliability of the backhaul communications, BS to BS (BS-BS) wireless communications can have the same or similar link recovery procedures as described above for the BS-MS communications. One difference is that for the scenario that the BS wants to establish backhaul communications with the network via other BSs, the BS examines the entire route, rather than just one hop as in BS-MS communications. When one or more links between BSs have a bad connection, the BS determines an alternative route towards the network, rather than just replacing each bad BS-BS link with another BS-BS link.

According to an embodiment of the present disclosure, instead of each cell having a wireless backhaul with the network, a cell site has connectivity to the backhaul, and the cells in the same site share the backhaul. In an alternative embodiment, a cell site can have one or multiple routes between the cell site and the network.

ABS may have one or multiple backhaul units at the BS site. The backhaul unit at the BS site has a RX module similar to a MS and it receives information from other BS sites. The backhaul unit(s) at the BS site may have a TX module which may use one or more different frequency carriers, RF chains, arrays, or beams with different spatial directions, from the other TXs for the access unit which serve the MSs. For example, one BS can have multiple cells where each cell has a backhaul unit. In an embodiment, one cell can have multiple backhaul units. Or one BS can have one backhaul unit, regardless how many cells the BS has. The wireless backhaul unit(s) at the BS site may be connected to one or multiple other base stations or cells.

In accordance with an embodiment of this disclosure, when a current link between a first BS and a second BS is under conditions such that the link may be lost, one of the BSs or the network can recover the current link. If the current link is lost, the BS or the network can try to establish a link by: (i) recovering the current link, (ii) establishing a new link by switching to another beam in the same control channel, (iii) switching to one or more beams in another control channel, (iv) switching to a cell that is at the same cell site as the current cell, (v) switching to a cell at another cell site with a wired backhaul link, or (vi) switching to a cell at another cell site with a wireless backhaul.

The BS or the network can maintain a list of the candidate beams and/or cells based on the measurement and the topology information, such as cell sites and backhaul conditions (e.g., wired or wireless). Candidate beam priority can be assigned according to whether the candidate beam is in the same control channel, the same cell, the same cell site as the current beam, a cell with wired backhaul, or a cell with a wireless backhaul. These may be ordered in descending priority order. A determination of which beam would have a higher priority can also be made jointly with a measurement of signal strength, etc. For example, the beams with higher signal strength can be candidates with higher priority. If some candidate beams have a similar signal strength (e.g., the difference in signal strength between candidate beams is within a threshold), then the priority order can be determined by whether the candidate beam is in the same control channel, the same cell, the same cell site as the current beam, a cell with wired backhaul, or a cell with a wireless backhaul, which may be ordered in descending priority order.

Figure 9:
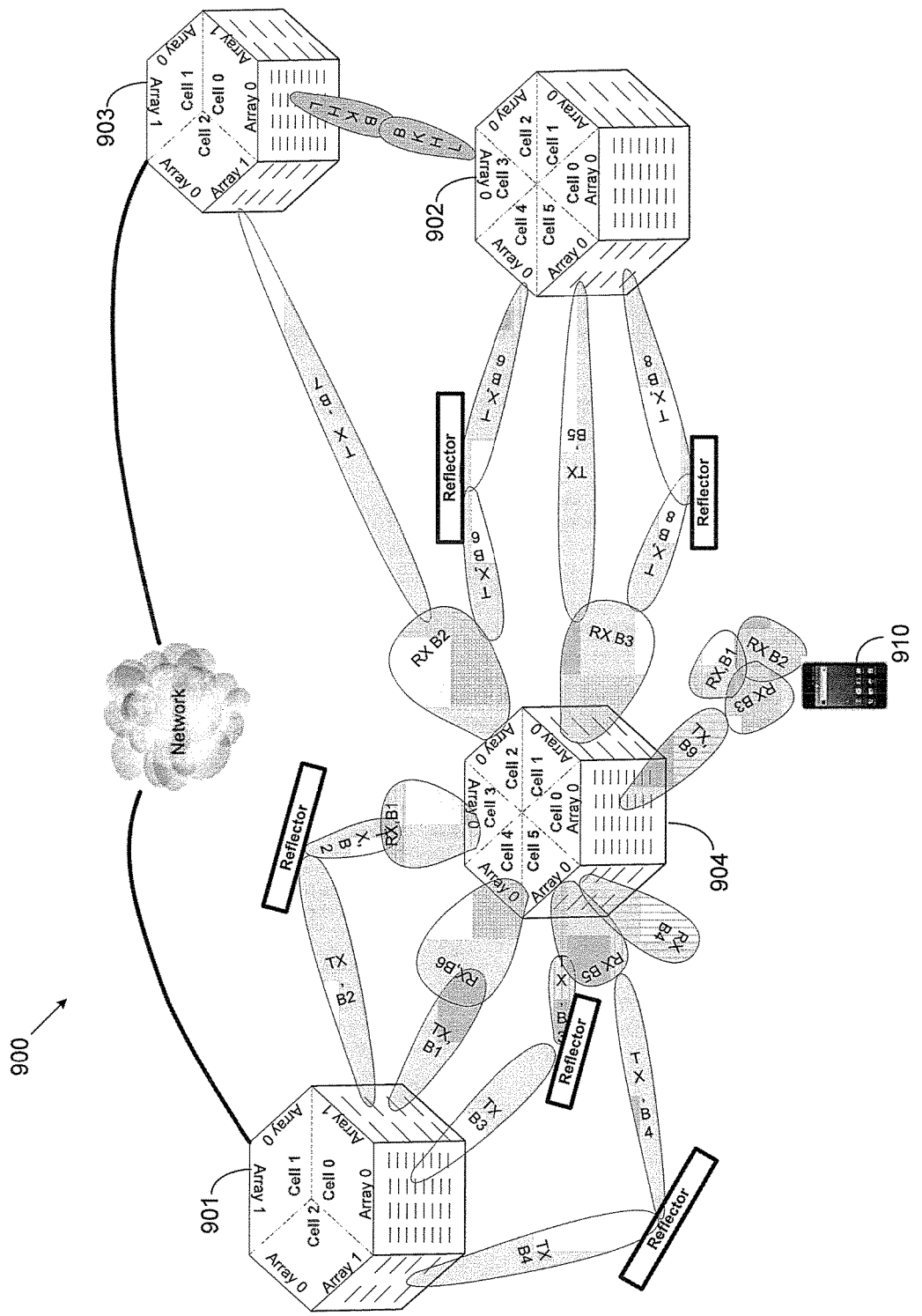
FIG. 9 illustrates another example of current beams and candidate beams and cells based on topology, according to an embodiment of this disclosure.

FIG. 9 illustrates another example of current beams and candidate beams and cells based on topology, according to an embodiment of this disclosure. The embodiment of wireless communication system 900 illustrated in FIG. 9 is for illustration only. Other embodiments of the wireless communication system 900 could be used without departing from the scope of this disclosure.

As shown in FIG. 9, system 900 includes base stations 901-904 and mobile station 910. Base stations 901-904 may represent one or more of base stations 101-103 of FIG. 1, base stations 401-403 of FIG. 4, or base stations 601-603 of FIG. 6. Likewise, mobile stations 910 may represent one or more of subscriber stations 111-116 of FIG. 1, subscriber stations 410-430 of FIG. 4, or subscriber stations 610, 620 of FIG. 6.

In FIG. 9, BS 904 does not have a wired backhaul. BS 904 looks for other BSs, and establishes a wireless backhaul via wireless links with other BSs which have connectivity to the network. Instead of each cell having a wireless backhaul with the network, a cell site can have backhaul connectivity, and the cells in the same site can share the backhaul. The RX beams for BS 904 can be distributed in all cells at the BS 904 site.

BS 904 may receive one or multiple beams from one or multiple BSs 901-903, over its one or multiple RX beams. For the purpose of this example, it is assumed that BS 904 has a best connection with BS1 Cell 0 through transmission beam TX B1 and receive beam RX B3. BS 904 also monitors the other beams that it can receive. BS 904 can determine that BS 901 Cell 0 TX B2 and B3 are from the same cell as its current best connection, i.e., BS 901 Cell 0 TX B1. Accordingly, BS 904 can place BS 901 Cell 0 TX B2 and BS 901 Cell 0 TX B3 as candidate beams in higher priority, because a switch to either BS 901 Cell 0 TX B2 and BS 901 Cell 0 TX B3 would not necessitate a cell switch (i.e., all three beams are associated with the same cell BS 901 Cell 0).

If TX B1 and TX B2 are associated with the same control channel, but TX B1 and TX B3 are associated with different control channels, TX B2 may be assigned a higher priority as a candidate than TX B3 because a switch to TX B2 would not require a control channel switch, whereas a switch to TX B3 would include a control channel switch. Similarly, BS 901 Cell 2 TX B4 can be assigned as candidate beams with a second level of priority, because a beam switch from Cell 0 to Cell 2 of BS 901 includes a cell switch, but would not require a backhaul data delivery from Cell 0 to Cell 2 since they are at the same cell site.

The beam from BS 903 Cell 2 TX B7 is a candidate beam for beam switching that can be assigned a third level of priority because a beam switch to BS 903 Cell 2 TX B7 includes a cell site switch (from BS 901 to BS 903), but BS 903 has a wired backhaul. The beams from BS 902 TX B5, B6, and B8 are candidate beams that can be assigned a fourth level of priority because BS 902 has a wireless backhaul, and a switch to BS 902 may introduce additional delay and cost for backhaul data transferring if the current beam should be switched to BS 902 TX B5, B6, or B8. TX B9 is from BS 904 to communicate with MS 910.

The beam from the base station can be the beam containing a synchronization channel, or the beam with a broadcast channel, or the beam with a data control channel, or even the data beam. In this example, the candidate beam priority is determined according to whether the candidate beam is in the same control channel, the same cell, the same cell site as the current beam, a cell with wired backhaul, or a cell with a wireless backhaul, where these are ordered in descending priority order. A determination of which beam would have a higher priority can also be made jointly with a measurement of signal strength, etc. For example, the beams with higher signal strength can be candidates with higher priority. If some candidate beams have a similar signal strength (e.g., the difference in signal strength between candidate beams is within a threshold), then the priority order can be determined by whether the candidate beam is in the same control channel, the same cell, the same cell site as the current beam, a cell with wired backhaul, or a cell with a wireless backhaul, which may be ordered in descending priority order.

Figure 10:
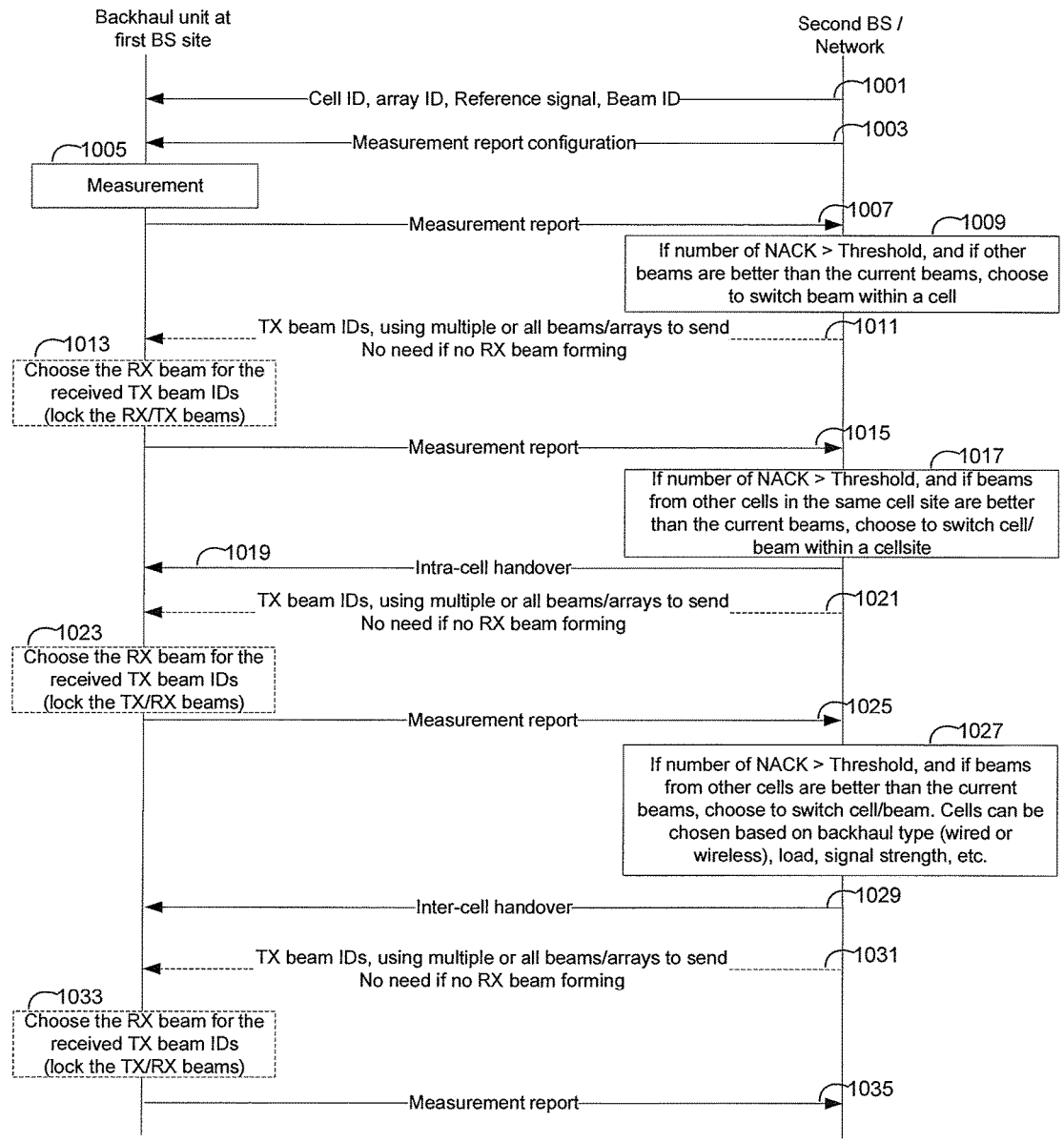
FIG. 10 illustrates an example flow diagram of network controlled BS-BS beam/cell switching for reliability enhancement, according to an embodiment of this disclosure.

FIG. 10 illustrates an example flow diagram of network controlled BS-BS beam/cell switching for reliability enhancement, according to an embodiment of this disclosure. The flow diagram illustrated in FIG. 10 is for illustration only. Other embodiments of the flow diagram could be used without departing from the scope of this disclosure.

In the embodiment of FIG. 10, each antenna array is configured to steer its beams, and the first BS can measure the beams and report back to the network information about the beam quality. If the current link of the BS becomes unsatisfactory, one or more other beams with higher quality (if any) in the same array can be selected and used for communication. These can be narrow or wide beams. One or more other beams from other arrays can also be used. One or more beams from the arrays in a different cell at the same cell location can also be used. Or one or more beams from the arrays in a different cell at a different cell site can be used. The beams may include a beam containing a synchronization channel, a beam with a broadcast channel, a beam with a data control channel, or a data beam.

In operation 1001, the second BS or the network sends one or more of a physical cell ID, array ID, identification for beams (e.g., beam ID), and reference signals, to the first BS. In operation 1003, the second BS or the network may also send the measurement configuration to the first BS. In operation 1005, the first BS performs the measurement, and in operation 1007, the first BS sends the measurement report to the second BS or the network. The measurement report may include, e.g., the best pair of second BS TX beam and first BS RX beam, multiple good pairs of second BS TX beam and first BS RX beam, etc., and the signal strength (SINR, SNR, etc.).

If certain conditions are met, the second BS selects other beams within the cell for the first BS (operation 1009). The conditions may include, for example, that the number of NACKs is greater than a threshold, and other beams are better (that is, better by a certain value, e.g., several dBs in signal strength or SINR, etc.) than the current beam based on the measurement report, etc.

In operation 1011, the second BS or the network sends the TX beam IDs to be switched to, to the first BS. If the beam to be switched is a TX data beam to be switched, the information of the TX beam ID to be switched can be included in the message of scheduling information. If the beam to be switched is a TX data control beam, the information can be included in a message. The message can also include when the specified TX beam IDs will be used (e.g., after how many subframes, frames, superframes, etc., or at which subframe, frame, superframe, etc., the switch will occur). To increase the reliability that the first BS will receive the message, the second BS may send the message using multiple beams or arrays.

Once the first BS receives the TX beam IDs that the BS will be switching to, the first BS locks its RX beam towards the TX beam ID (operation 1013). The first BS can lock the RX beam based on its previous measurement. For example, the first BS can examine the measurement and determine which RX beam is the best for the TX beam with the TX beam ID indicated by the second BS that the second BS will use in the following transmission.

If the first BS does not have RX beam forming, and the beam to be switched is a data beam, then the second BS may not need to send the TX beam IDs to the first BS, because the first BS does not need to lock its RX beam towards the TX beam. However, if the beam to be switched is a control beam, then the TX beam ID for the control beam may be required in the message to the first BS.

The second BS uses the TX beam IDs at the specified time to send information to the first BS. If the beam is a control beam, such as a data control beam, then the first BS may send a confirmation that the first BS receives the message about the BS TX control beam switch (operation 1015), and the second BS can use the TX beam IDs to send information to the first BS, after the second BS receives the confirmation. The first BS can then communicate with the second BS at the new BS TX beam. The first BS can perform measurement when needed.

If certain conditions are met, the second BS selects other cells in the same cell site (operation 1017). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use, etc.

In such a situation, an intra cell handover, which is to switch the current cell to another cell in the same cell site, can be performed (operation 1019). The first BS can report the measurement on the pairs of neighboring cells' TX beams (e.g., beams for the synchronization channel or broadcast channel, or data control beam) and corresponding RX beams. The second BS can select which cell the first BS should switch to. In operation 1021, the second BS sends a message to the first BS, where the message can include the information of the target cell's physical ID or the target cell's TX beam IDs (e.g., beams for the synchronization channel or broadcast channel, or data control beam).

The first BS receives the message, and then locks its RX beam towards the target cell's TX beam with the received target cell TX beam ID (operation 1023). The first BS may lock its RX beam based on its previous measurement. For example, the first BS may select a good RX beam such that the pair of the RX beam and target cell's TX beam with the received TX beam ID exhibits good quality.

In operation 1025, the first BS may send confirmation on whether the message including the target cell, target cell TX beam IDs, etc. is received. After the second BS receives the confirmation, the intra-cell handover may be performed. The first BS may perform network re-entry to the target cell. The current cell of the first BS may transfer the communication context to the target cell.

If certain conditions are met, the second BS selects cells in a different cell site (operation 1027). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use or in the cells within the same cell site as the current cell, etc. The cell selection may also include consideration of the factor of the cell load, whether the cell has a wired backhaul or a wireless backhaul (a cell wireless backhaul may be assigned a lower priority due to its delay and cost), signal strength, etc.

In such a situation, an inter cell handover, which is to switch the current cell to another cell in the different cell site, can be performed (operation 1029). The first BS reports the measurement on the pairs of neighboring cells' TX beams (e.g., beams for the synchronization channel or broadcast channel, or data control beam) and corresponding RX beams. The second BS selects which cell the first BS should switch to. In operation 1031, the second BS sends a message to the first BS, where the message can include the information of the target cell's physical ID or the target cell's TX beam IDs (e.g., beams for the synchronization channel or broadcast channel, or data control beam).

The first BS receives the message, and thens lock its RX beam towards the target cell's TX beam with the received target cell TX beam ID (operation 1033). The first BS may lock its RX beam based on its previous measurement. For example, the first BS may select a good RX beam where the pair of the RX beam and target cell's TX beam with the received TX beam ID exhibits good quality.

In operation 1035, the first BS sends confirmation on whether the message including the target cell, target cell TX beam IDs, etc. is received. After the second BS receives the confirmation, the inter-cell handover may be performed. The serving cell may deliver the communication context to the target cell.

Figure 11:
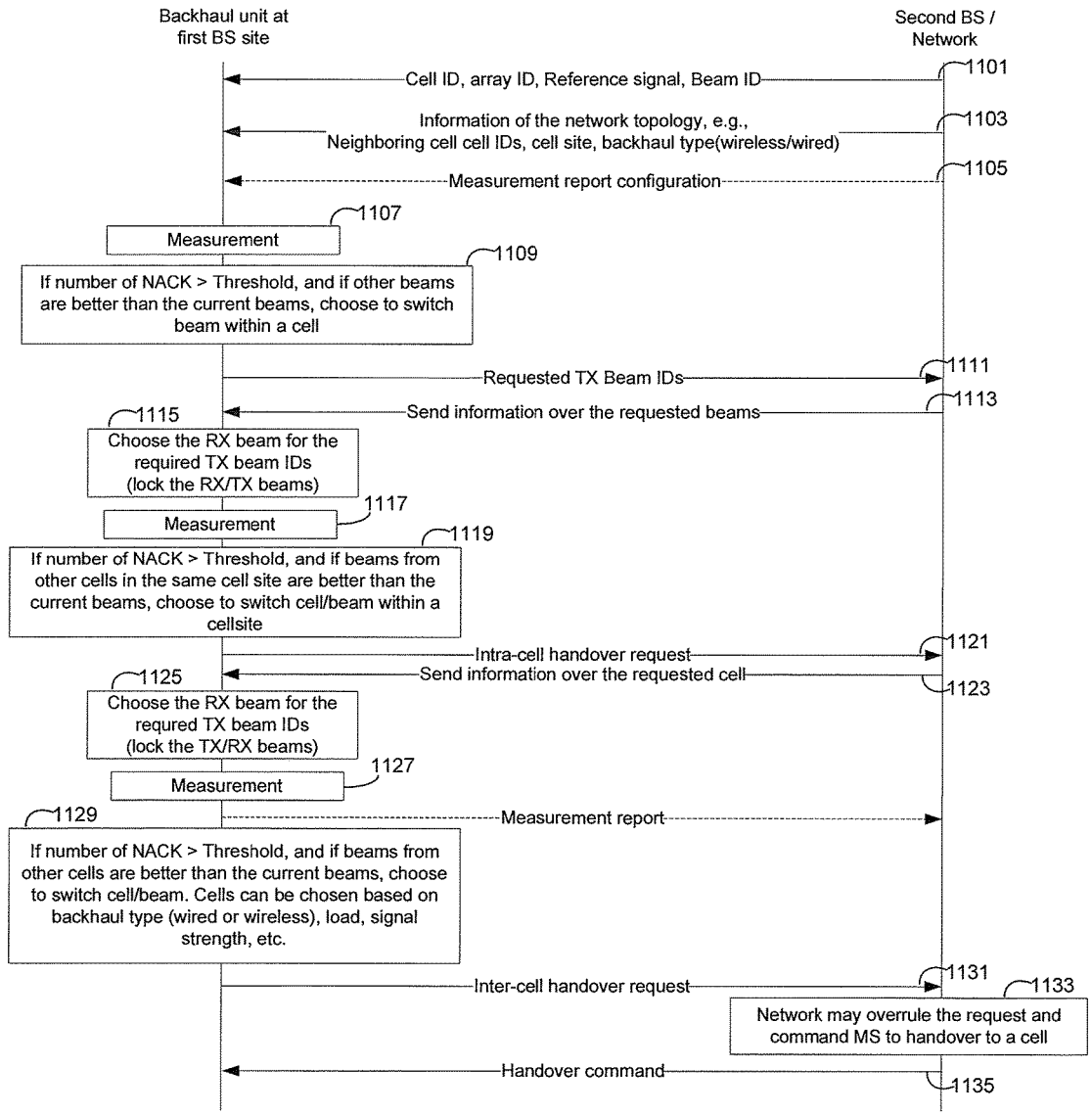
FIG. 11 illustrates an example flow diagram of first BS assisted BS-BS beam/cell switching for reliability enhancement, according to an embodiment of this disclosure.

FIG. 11 illustrates an example flow diagram of first BS assisted BS-BS beam/cell switching for reliability enhancement, according to an embodiment of this disclosure. The flow diagram illustrated in FIG. 11 is for illustration only. Other embodiments of the flow diagram could be used without departing from the scope of this disclosure.

In operation 1101, the second BS or the network sends one or more of a physical cell ID, array ID, identification for beams (e.g., beam ID), or reference signals, to the first BS. In operation 1103, the second BS or the network sends information of the network topology to the first BS, including cell IDs, cell sites, and backhaul types (wireless or wired, and if wireless then the number of hops of the backhaul from the second BS to the network), of the neighboring cells, etc. In operation 1105, the second BS or the network may also send the measurement configuration to the first BS. In operation 1107, the first BS performs the measurement, and sends the measurement report to the second BS or the network. The measurement report may include, e.g., the best pair of second BS TX beam and first BS RX beam, multiple good pairs of second BS TX beam and first BS RX beam, etc., and the signal strength (e.g., SINR, SNR, etc.).

If certain conditions are met, the first BS selects other beams within the cell (operation 1109). The conditions may include, for example, that the number of NACKs is greater than a threshold, and other beams are better (that is, better by a certain value, e.g., several dBs in signal strength or SINR, etc.) than the current beam based on the measurement, etc. The first BS then sends a request to the second BS or the network regarding the beam switching, where the request can include the selected BS TX beam IDs (operation 1111).

The second BS or the network sends information on the beam with the first BS requested BS TX beam IDs, to the first BS. If the beam to be switched is a TX data beam, the timing of the TX beam ID to be switched to may be included in the message of scheduling information. If the beam to be switched is a TX data control beam, the second BS or the network may send a message that includes when the specified TX beam IDs will be used (e.g., after how many subframes, frames, superframes, etc., or at which subframe, frame, superframe, etc., the switch will occur). To increase the reliability that the first BS will receive the message, the second BS may send multiple copies of the message, or the second BS may send the message using multiple beams or arrays. The first BS may then send a confirmation about the message for the data control beam switch.

In operation 1113, the second BS or the network sends information on the beam with the first BS requested BS TX beam IDs, at the specified time, or at a time determined by the second BS or the network.

The first BS locks its RX beam towards the requested TX beam ID (operation 1115). The first BS can lock the RX beam based on its previous measurement. For example, the first BS can examine the measurement and determine which RX beam is the best for the TX beam with the TX beam ID indicated by the second BS, which the second BS will use in the following transmission. The first BS then communicates with the second BS at the new BS TX beam. The first BS can perform measurement when needed (operation 1117).

If certain conditions are met, the first BS selects other cells in the same cell site (operation 1119). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use, etc.

In such a situation, an intra cell handover, which is to switch the current cell to another cell in the same cell site, may be performed. The first BS can report the measurement on the pairs of neighboring cells' TX beams (e.g., beams for the synchronization channel or broadcast channel, or data control beam) and corresponding RX beams. The first BS can select which cell the first BS should switch to.

In operation 1121, the first BS sends a message to the second BS or the network, where the message can include the information of the target cell's physical ID or the target cell's TX beam IDs (e.g., beams for the synchronization channel or broadcast channel, or data control beam). In operation 1123, the second BS sends a confirmation to the first BS. The first BS can send another confirmation back. The first BS can then perform network re-entry to the target cell. The current cell of the first BS transfers the communication context to the target cell.

The second BS or the network can also overrule the request from the first BS about the target cell. For example, if the first BS sends a measurement report to the second BS or the network, the second BS and network can use the information to make a decision. The second BS or the network can send a handover command to the first BS, where the command includes the information on the target cell.

The first BS locks its RX beam towards the target cell's TX beams (operation 1125). The first BS may lock its RX beam based on its previous measurement. For example, the first BS may select a good RX beam such that the pair of the RX beam and target cell's TX beam exhibits good quality. The first BS can start the network re-entry process. The first BS can perform measurement when needed (operation 1127).

If certain conditions are met, the first BS selects other cells in a different cell site (operation 1129). The conditions may include, for example, that the number of NACKs is greater than a threshold, and beams from other cells are better (that is, better by a certain value, e.g., several dBs in signal strength or SINR, etc.) than the current beam based on the measurement report. Based on the conditions, it may be determined that there are no good candidate beams (e.g., the signal strength is not good enough) within the current cell to use or in the cells within the same cell site as the current cell, etc. The cell selection may also include consideration of the factor of the cell load, whether the cell has a wired backhaul or a wireless backhaul (a cell wireless backhaul may be assigned a lower priority due to its delay and cost), signal strength, etc.

In such a situation, an inter cell handover, which is to switch the current cell to another cell in the different cell site, can be performed. The first BS reports the measurement on the pairs of neighboring cells' TX beams (e.g., beams for the synchronization channel or broadcast channel, or data control beam) and corresponding RX beams. The second BS or the first BS can select which cell the first BS should switch to.

In operation 1131, the first BS sends a message to the second BS or the network, where the message can include the information of the target cell's physical ID or the target cell's TX beam IDs (e.g., beams for the synchronization channel or broadcast channel, or data control beam). If the network or the second BS does not agree, the network or the second BS can overrule the decision made by the first BS, and the second BS picks up the target cell (operation 1133). The second BS sends a handover command to the first BS, where the handover command includes the target cell information (operation 1135).

The first BS receives the message, and then locks its RX beam towards the target cell's TX beam. The first BS may lock its RX beam based on its previous measurement. For example, the first BS may select a good RX beam where the pair of the RX beam and target cell's TX beam exhibits good quality.

The first BS sends confirmation on whether the message including the target cell, target cell TX beam IDs, etc., is received. After the second BS receives the confirmation, the inter-cell handover may be performed. The serving cell may deliver the communication context to the target cell. The first BS can perform a network re-entry to the target cell.

In an embodiment of the present disclosure, one or more timers can be used for link recovery. For example, if a timer expires but the link cannot be recovered within an array (e.g., by beam switching, beam broadening, beam refinement, etc.), the BS or MS switches to other array. Or, if a timer expires but the link cannot be recovered within a cell, the BS or MS switches to other cell.

Timer values should be set differently for different states (e.g., idle, connected, etc.) and possibly for different QoS in a connected state. In an idle state, the timer can be set to a longer duration. Delay-sensitive traffic should have a shorter timer.

In another embodiment, the BS sends the information in both the current and candidate directions, for a certain time, until the switch is completed.

In another embodiment, an additional base station can be used to assist in the link recovery. For example, a MS reports that the MS needs a link recovery, due to one or more of the reasons described earlier. However, it may be determined that no listening BS currently is available to help. In such a situation, the network or the MS can wake up a BS, so that the BS can assist with the link recovery.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use by a network node in a wireless network, a method for enhancing reliability in wireless communication, the method comprising:
    determining, at a first network node, that a current link with a second network node is broken; and
    establishing, at the first network node, a new link with the second network node according to one of a plurality of switching rules for establishing the new link from the first network node, the switching rules for establishing the new link from the first network node ordered according to a priority among the switching rules, the priority assigned based on topology information of the new link, the topology information including at least one of cell identification, cell site and backhaul type,
    wherein the switching rules for establishing the new link from the first network node comprise (i) switching to another beam in a same control channel as a beam associated with the current link responsive to the determination that the current link is broken, (ii) switching to one or more beams in another control channel, (iii) switching to a cell that is at a same cell site as a current cell, (iv) switching to a cell at another cell site with a wired backhaul link, or (v) switching to a cell at another cell site with a wireless backhaul;
    wherein switching to another beam in the same control channel as the beam associated with the current link comprises one of:
        switching to another beam in a same antenna array in a current cell, or
        switching to another beam in a different antenna array in the current cell.

2. The method of claim 1, wherein each of the current link and the new link comprise at least one of a beam associated with a synchronization channel, a beam associated with a broadcast channel, a beam associated with a data control channel, and a data beam.

3. The method of claim 1, wherein the wireless network is a millimeter wave wideband communication network.

4. The method of claim 1, further comprising:
    monitoring a plurality of candidate beams between the first network node and the second network node for switching, and prioritizing each candidate beam based on whether the candidate beam is (i) a beam in a same control channel as a beam associated with the current link, (ii) a beam in another control channel, (iii) a beam in another cell that is at a same cell site as a current cell, (iv) a beam in a cell at another cell site with a wired backhaul link, or (v) a beam in a cell at another cell site with a wireless backhaul.

5. The method of claim 1, further comprising:
    transmitting at least one first control beam including reference signals on which the second network node can perform a measurement.

6. The method of claim 1, further comprising:
    receiving a measurement report from the second network node; and
    based on the measurement report, selecting a new beam,
    wherein the measurement report comprises at least one of: a best pair of transmit beam and receive beam, a plurality of good pairs of transmit beam and receive beam, and a signal strength.

7. The method of claim 1, wherein the first network node is a mobile station and the second network node is a base station.

8. The method of claim 1, wherein the first network node is a first base station and the second network node is a second base station.

9. A base station configured to enhance reliability in a wireless network, the base station comprising:
    a processor configured to:
        determine that a current link with a network node is broken; and
        establish a new link with the network node according to one of a plurality of switching rules for establishing the new link from the network node, the switching rules for establishing the new link from the network node ordered according to a priority among the switching rules, the priority assigned based on topology information of the new link, the topology information including at least one of cell identification, cell site and backhaul type,
    wherein the switching rules for establishing the new link from the network node comprise (i) switching to another beam in a same control channel as a beam associated with the current link responsive to the determination that the current link is broken, (ii) switching to one or more beams in another control channel, (iii) switching to a cell that is at a same cell site as a current cell, (iv) switching to a cell at another cell site with a wired backhaul link, or (v) switching to a cell at another cell site with a wireless backhaul;
    wherein switching to another beam in the same control channel as the beam associated with the current link comprises one of:
        switching to another beam in a same antenna array in a current cell, or
        switching to another beam in a different antenna array in the current cell.

10. The base station of claim 9, wherein each of the current link and the new link comprise at least one of a beam associated with a synchronization channel, a beam associated with a broadcast channel, a beam associated with a data control channel, and a data beam.

11. The base station of claim 9, wherein the wireless network is a millimeter wave wideband communication network.

12. The base station of claim 9, the processor further configured to:
    monitor a plurality of candidate beams between the base station and the network node for switching, and prioritizing each candidate beam based on whether the candidate beam is (i) a beam in a same control channel as a beam associated with the current link, (ii) a beam in another control channel, (iii) a beam in another cell that is at a same cell site as a current cell, (iv) a beam in a cell at another cell site with a wired backhaul link, or (v) a beam in a cell at another cell site with a wireless backhaul.

13. The base station of claim 9, the processor further configured to:
    transmit at least one first control beam including reference signals on which the network node can perform a measurement.

14. The base station of claim 9, the processor further configured to:
  receive a measurement report from the network node; and based on the measurement report, select a new beam,
  wherein the measurement report comprises at least one of: a best pair of transmit beam and receive beam, a plurality of good pairs of transmit beam and receive beam, and a signal strength.

15. The base station of claim 9, wherein the network node is a mobile station or a second base station.

16. A mobile station configured to enhance reliability in a wireless network, the mobile station comprising:
  a processor configured to:
    determine that a current link from the mobile station with a base station is broken; and
    establish a new link from the mobile station with the base station according to one of a plurality of switching rules for establishing the new link from the mobile station, the switching rules for establishing the new link from a network node ordered according to a priority among the switching rules, the priority assigned based on topology information of the new link, the topology information including at least one of cell identification, cell site and backhaul type,
  wherein the switching rules for establishing the new link from the mobile station comprise (i) switching to another beam in a same control channel as a beam associated with the current link responsive to the determination that the current link is broken, (ii) switching to one or more beams in another control channel, (iii) switching to a cell that is at a same cell site as a current cell, (iv) switching to a cell at another cell site with a wired backhaul link, or (v) switching to a cell at another cell site with a wireless backhaul;
  wherein switching to another beam in the same control channel as the beam associated with the current link comprises one of:
    switching to another beam in a same antenna array in a current cell, or
    switching to another beam in a different antenna array in the current cell.

17. The mobile station of claim 16, wherein each of the current link and the new link comprise at least one of a beam associated with a synchronization channel, a beam associated with a broadcast channel, a beam associated with a data control channel, and a data beam.

18. The mobile station of claim 16, wherein the wireless network is a millimeter wave wideband communication network.

19. The mobile station of claim 16, the processor further configured to:
  monitor a plurality of candidate beams between the mobile station and the base station for switching, and prioritizing each candidate beam based on whether the candidate beam is (i) a beam in a same control channel as a beam associated with the current link, (ii) a beam in another control channel, (iii) a beam in another cell that is at a same cell site as a current cell, (iv) a beam in a cell at another cell site with a wired backhaul link, or (v) a beam in a cell at another cell site with a wireless backhaul.

20. The mobile station of claim 16, the processor further configured to:
  send a measurement report to the base station,
  wherein the measurement report is used by the base station to select a new beam,
  wherein the measurement report comprises at least one of: a best pair of transmit beam and receive beam, a plurality of good pairs of transmit beam and receive beam, and a signal strength.

* * * * *

UNITED STATES PATENT AND TRADEMARK OFFICE
CERTIFICATE OF CORRECTION

PATENT NO. : 10,264,478 B2
APPLICATION NO. : 13/712393
DATED : April 16, 2019
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,187 days.

Signed and Sealed this
Sixth Day of December, 2022

Katherine Kelly Vidal
*Director of the United States Patent and Trademark Office*